(12) United States Patent
Caveney et al.

(10) Patent No.: US 8,256,971 B2
(45) Date of Patent: *Sep. 4, 2012

(54) REVERSIBLE FIBER OPTIC STUB CLAMPING MECHANISM

(75) Inventors: Jack E. Caveney, North Palm Beach, FL (US); Shaun P. Brouwer, St. John, IN (US); Vincent M. Barone, Tinley Park, IL (US); Scott R. Hartman, Oak Forest, IL (US); Andrew J. Stroede, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/213,405

(22) Filed: Aug. 19, 2011

(65) Prior Publication Data

US 2011/0305421 A1 Dec. 15, 2011

Related U.S. Application Data

(63) Continuation of application No. 12/785,911, filed on May 24, 2010, now Pat. No. 8,002,476, which is a continuation of application No. 12/356,179, filed on Jan. 20, 2009, now Pat. No. 7,722,262, which is a continuation of application No. 11/670,219, filed on Feb. 1, 2007, now Pat. No. 7,568,845, which is a continuation of application No. 11/328,947, filed on Jan. 10, 2006, now Pat. No. 7,178,990, which is a continuation of application No. 10/647,848, filed on Aug. 25, 2003, now Pat. No. 7,011,454.

(51) Int. Cl.
*G02B 6/36* (2006.01)

(52) U.S. Cl. .......................................... 385/87; 385/66
(58) Field of Classification Search .................. 385/87, 385/66
See application file for complete search history.

(56) References Cited

U.S. PATENT DOCUMENTS

| 3,243,550 A | 3/1966 | Hollins |
| 3,778,741 A | 12/1973 | Schmidt, Jr. |
| 3,947,081 A | 3/1976 | Peterson |
| 4,030,809 A | 6/1977 | Onishi et al. |
| 4,360,268 A | 11/1982 | Zucker et al. |
| 4,504,815 A | 3/1985 | Harwath |
| 4,553,814 A | 11/1985 | Bahl et al. |
| 4,576,437 A | 3/1986 | Ohta et al. |

(Continued)

FOREIGN PATENT DOCUMENTS

EP 1136860 A2 9/2001

*Primary Examiner* — Charlie Peng
*Assistant Examiner* — Peter Radkowski
(74) *Attorney, Agent, or Firm* — Robert A. McCann; Christopher S. Clancy; Christopher K. Marlow

(57) ABSTRACT

A fiber optic stub fiber connector for reversibly and nondestructively terminating an inserted field fiber having a buffer over at least a portion thereof. The connector includes a housing and a ferrule including a stub fiber disposed within and extending from a bore through the ferrule. The ferrule is generally at least partially disposed within and supported by the housing. The connector further includes a reversible actuator for reversibly and nondestructively terminating the inserted field fiber to the stub fiber. The reversible actuator includes a buffer clamp for engaging with the buffer to simultaneously provide reversible and nondestructive strain relief to the terminated field fiber.

7 Claims, 20 Drawing Sheets

U.S. PATENT DOCUMENTS

| | | |
|---|---|---|
| 4,593,972 A | 6/1986 | Gibson |
| 4,687,288 A | 8/1987 | Margolin et al. |
| 4,734,059 A | 3/1988 | Melugin |
| 4,755,018 A | 7/1988 | Heng et al. |
| 4,812,006 A | 3/1989 | Osborn et al. |
| 4,834,487 A | 5/1989 | Abendschein et al. |
| 4,838,689 A | 6/1989 | Neumann |
| 4,867,523 A | 9/1989 | Scott, Jr. |
| 4,880,291 A | 11/1989 | Aberson, Jr. et al. |
| 4,898,446 A | 2/1990 | Hinckley |
| 4,923,274 A | 5/1990 | Dean |
| 4,991,929 A | 2/1991 | Bowen et al. |
| 5,008,545 A | 4/1991 | Anderson et al. |
| 5,040,867 A | 8/1991 | De Jong et al. |
| 5,067,783 A | 11/1991 | Lampert |
| 5,067,909 A | 11/1991 | Behning |
| 5,076,806 A | 12/1991 | Hotea et al. |
| 5,080,460 A | 1/1992 | Erdman et al. |
| 5,129,023 A | 7/1992 | Anderson et al. |
| 5,167,522 A | 12/1992 | Behning |
| 5,237,630 A | 8/1993 | Hogg et al. |
| 5,261,019 A | 11/1993 | Beard et al. |
| 5,297,227 A | 3/1994 | Brown et al. |
| 5,396,572 A | 3/1995 | Bradley et al. |
| 5,432,879 A | 7/1995 | Lee |
| 5,506,922 A | 4/1996 | Grois et al. |
| 5,524,159 A | 6/1996 | Turgeon et al. |
| 5,577,144 A | 11/1996 | Rossana et al. |
| 5,748,819 A | 5/1998 | Szentesi et al. |
| 5,892,871 A | 4/1999 | Dahan et al. |
| 5,915,056 A | 6/1999 | Bradley et al. |
| 5,943,460 A | 8/1999 | Mead et al. |
| 5,953,476 A | 9/1999 | Abe |
| 6,022,150 A | 2/2000 | Erdman et al. |
| 6,062,739 A | 5/2000 | Blake et al. |
| 6,173,097 B1 | 1/2001 | Throckmorton et al. |
| 6,179,482 B1 | 1/2001 | Takizawa et al. |
| 6,224,270 B1 | 5/2001 | Nakajima et al. |
| 6,379,054 B2 | 4/2002 | Throckmorton et al. |
| 6,439,780 B1 | 8/2002 | Mudd et al. |
| 6,648,521 B2 | 11/2003 | Roehrs et al. |
| 6,705,765 B2 | 3/2004 | Lampert et al. |
| 6,783,280 B2 | 8/2004 | Viklund |
| 7,011,454 B2 * | 3/2006 | Caveney et al. ............ 385/87 |
| 7,241,056 B1 | 7/2007 | Kuffel et al. |
| 8,002,476 B2 * | 8/2011 | Caveney et al. ............ 385/87 |
| 2001/0002220 A1 * | 5/2001 | Throckmorton et al. ....... 385/66 |
| 2003/0030788 A1 | 2/2003 | Beller |
| 2003/0086657 A1 | 5/2003 | Viklund |
| 2003/0215190 A1 | 11/2003 | Lampert et al. |
| 2005/0213890 A1 | 9/2005 | Barnes et al. |
| 2006/0093300 A1 | 5/2006 | Marrs et al. |

* cited by examiner

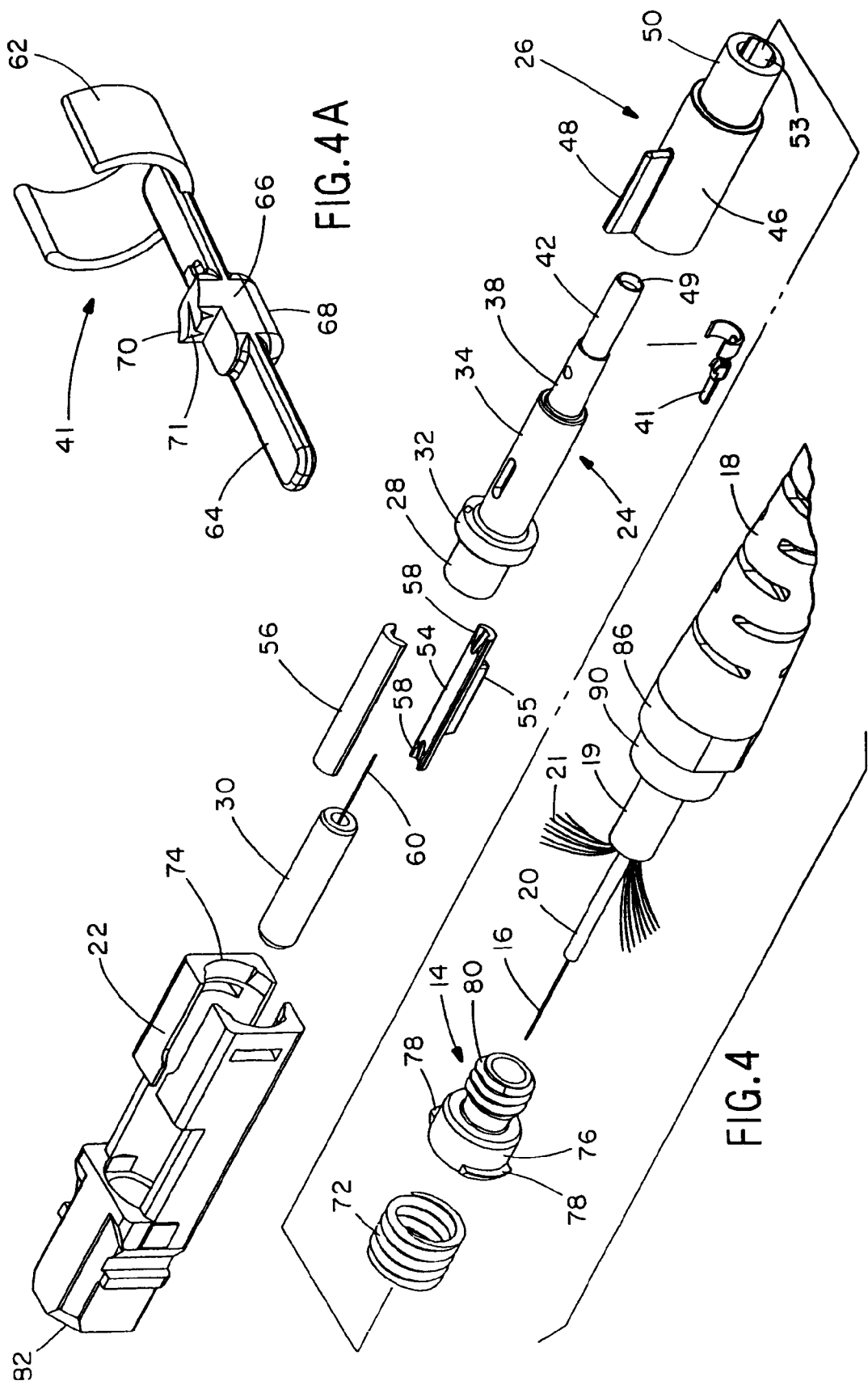

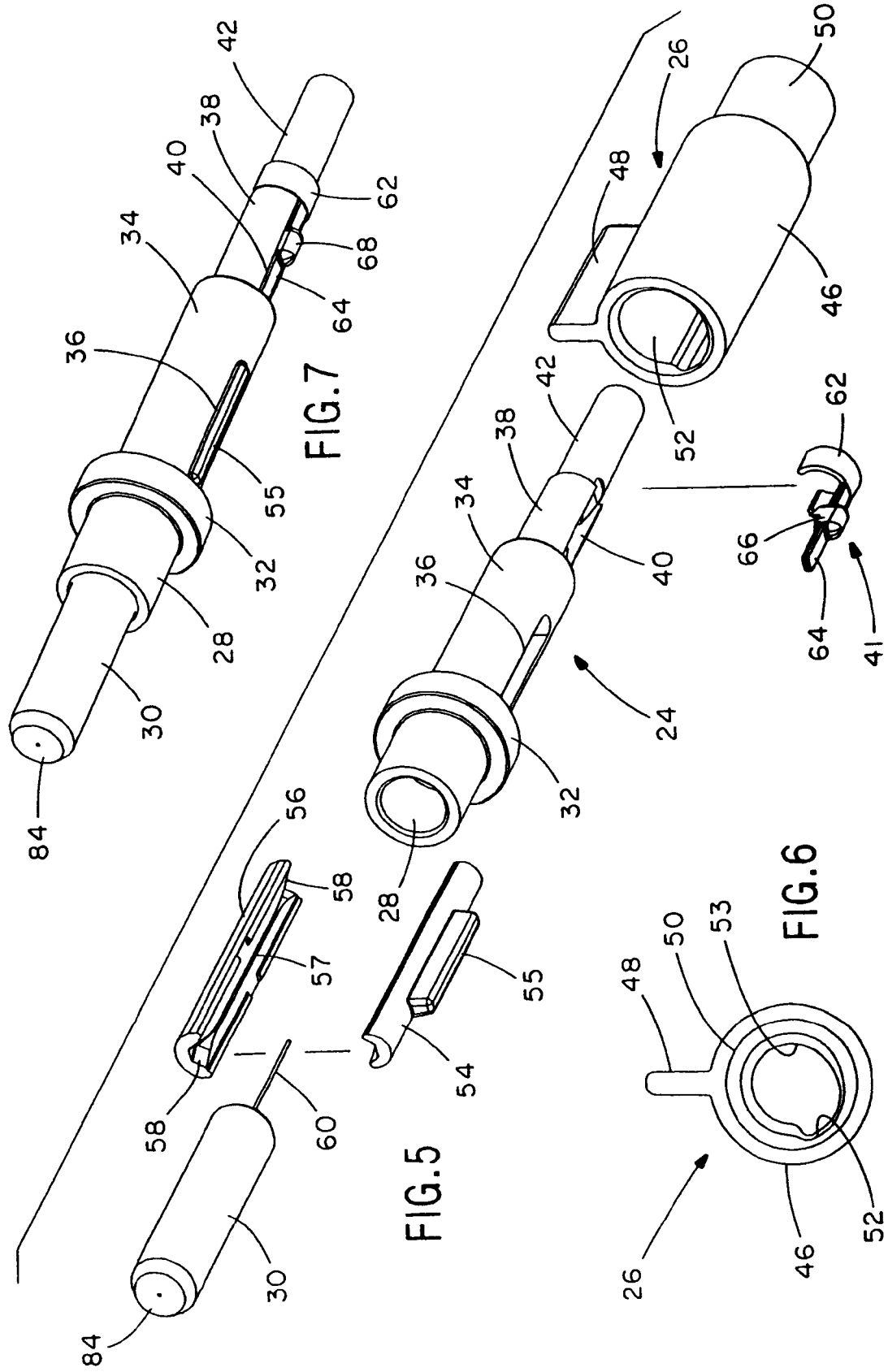

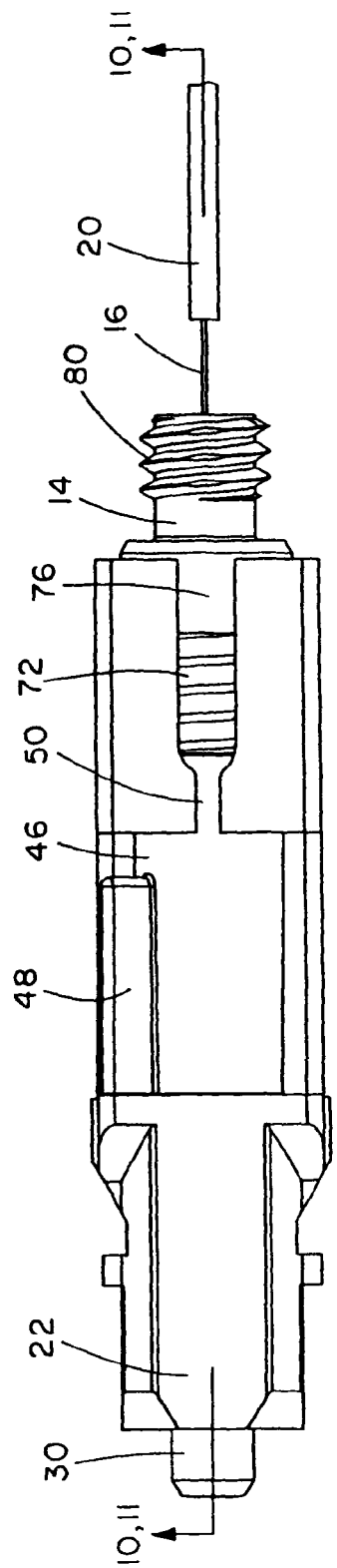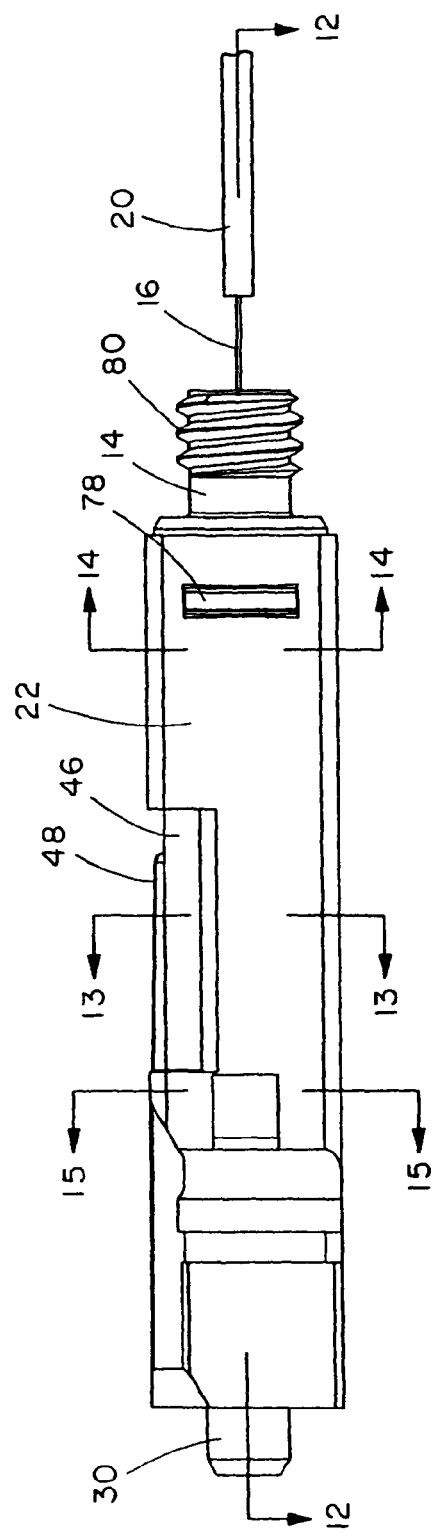
FIG.8
FIG.9

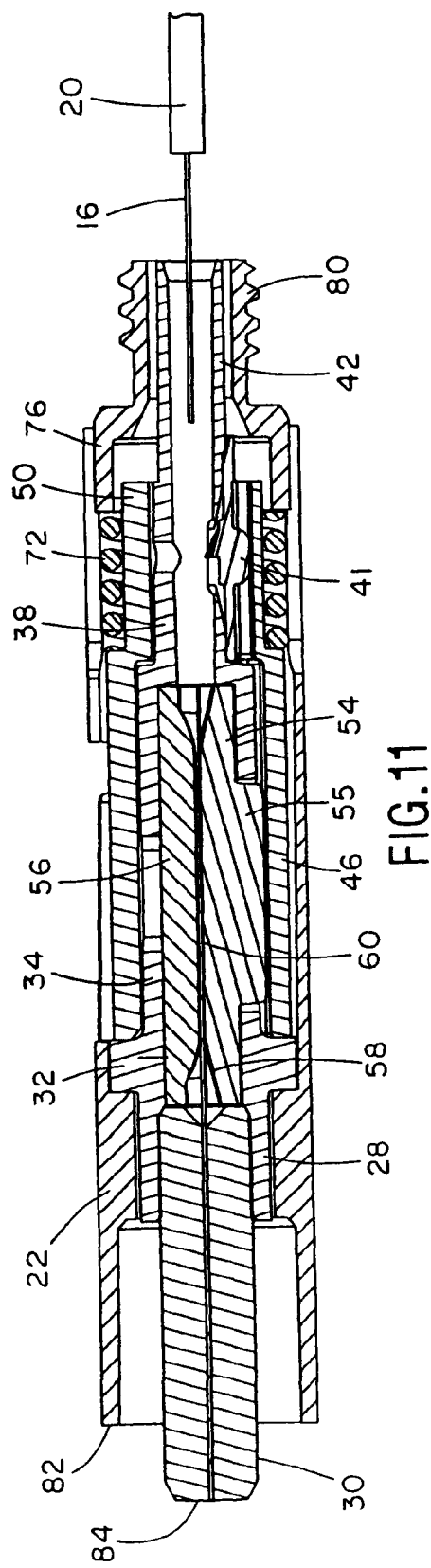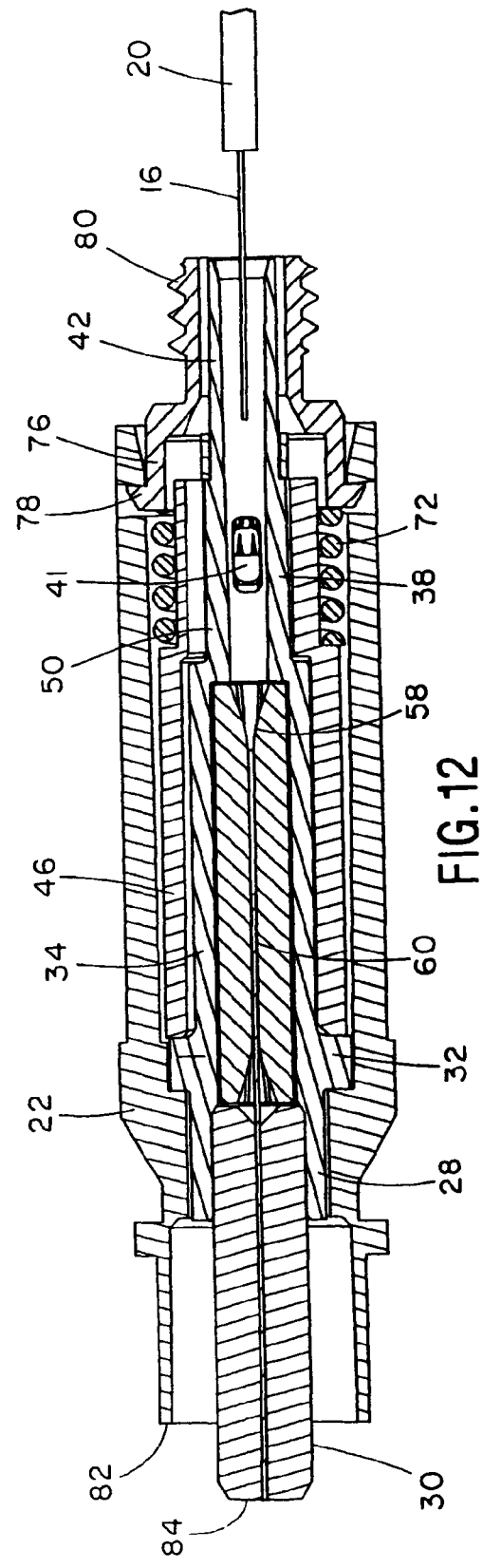

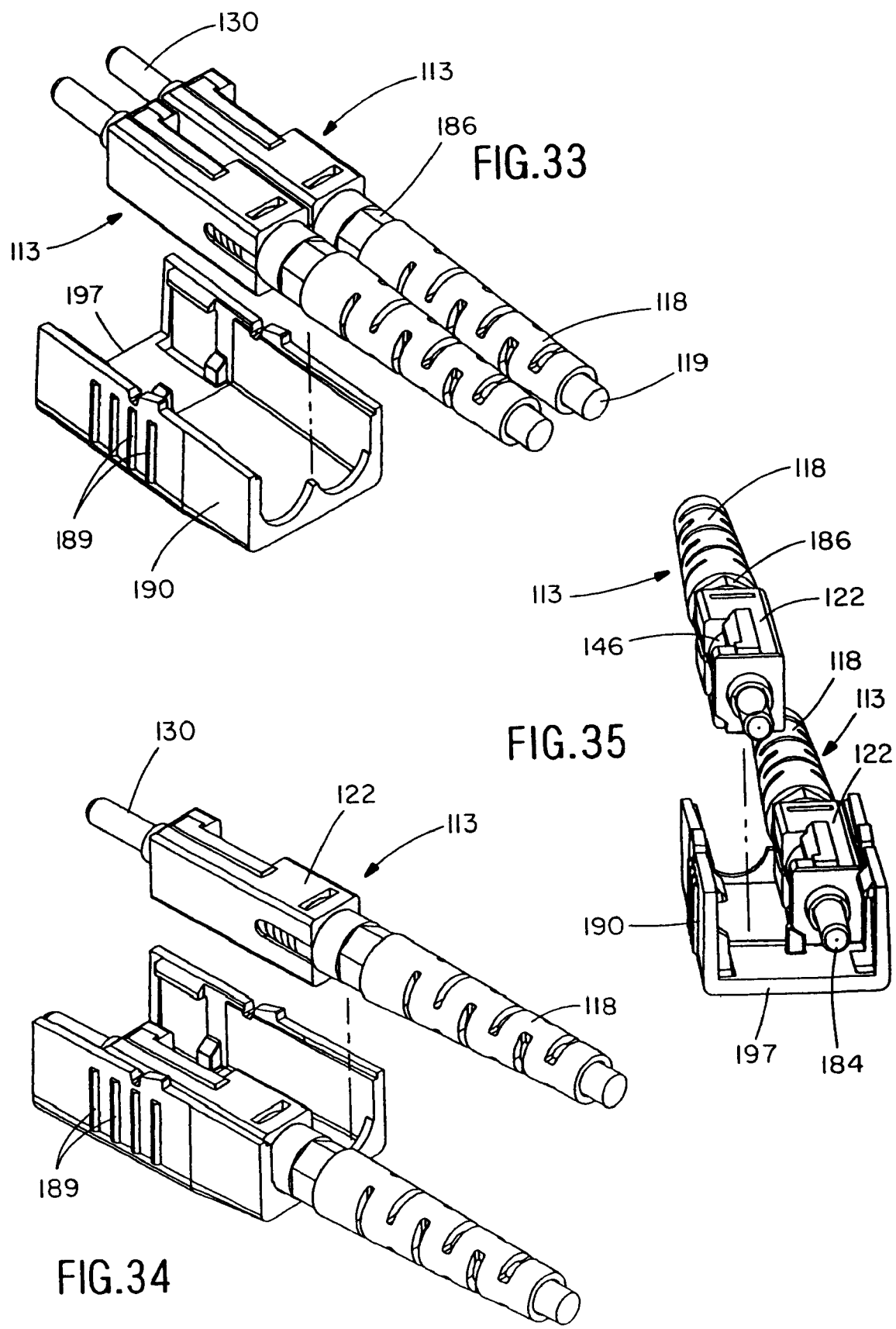

REVERSIBLE FIBER OPTIC STUB CLAMPING MECHANISM

CROSS-REFERENCE TO RELATED APPLICATION

This application is a continuation of U.S. patent application Ser. No. 12/785,911, filed May 24, 2010, which issued as U.S. Pat. No. 8,002,476, which is a continuation of U.S. patent application Ser. No. 12/356,179, filed Jan. 20, 2009, which issued as U.S. Pat. No. 7,722,262 on May 25, 2010, which is a continuation of U.S. patent application Ser. No. 11/670,219, filed Feb. 1, 2007, which issued as U.S. Pat. No. 7,568,845 on Aug. 4, 2009, which is a continuation of U.S. patent application Ser. No. 11/328,947, filed Jan. 10, 2006, which issued as U.S. Pat. No. 7,178,990, on Feb. 20, 2007, which is a continuation of U.S. patent application Ser. No. 10/647,848, filed Aug. 25, 2003, which issued as U.S. Pat. No. 7,011,454 on Mar. 14, 2006.

BACKGROUND OF THE INVENTION

Fiber optic networks are becoming increasingly commonplace in telecommunications applications due to their increased bandwidth and distance capabilities relative to copper networks. Compared to copper systems, however, fiber optic cables and connections are well-known for their more critical and difficult terminations. For example, the alignment between abutted glass cores within a fiber optic interface is crucial to the performance of the connection.

Field installation of standard "pot and polish" fiber optic connectors is extremely labor- and expertise-intensive. The installer is required to prepare a fiber end, glue the fiber end into the connector, cleave the excess fiber from the endface of the connector, and polish the endface of the connector to obtain the optimum geometry for optical performance. Endface polishing is a difficult and time-consuming step, particularly when using singlemode fiber, and it is best performed by an automated polishing machine. Automated polishing machines are often large and expensive, however, making them impractical for field use.

Fiber pigtail connectors were designed to eliminate the need for these lengthy steps. A pigtail connector is prepared at the factory with a length of fiber. In the factory, precise polishing machines can be used to achieve a consistent polish. The endfaces can be inspected at the factory to ensure correct endface geometry for optimum performance. In the field, the installer would have to splice a length of fiber to a cable by means of a fusion splicing machine. This eliminates much of the labor time, but it requires the installer to purchase a fusion splicing machine and protective sleeve, which are expensive. This type of connector would require extra storage space for protection of the fusion splice.

Fiber stub connectors were designed to eliminate the need for expensive fusion splicing equipment, splice protection, and lengthy termination steps. The stub connector employs a short fiber stub that is spliced to the field fiber within the connector. Stub connectors typically require a crimp to either activate the splice or retain the field fiber, or both. The crimping operation, however, whether occurring at the interface point or at some other point to retain the field fiber, may have a tendency to pull the field fiber and stub fiber apart, or otherwise damage the signal-passing function of the interface. If the connection is found to be poor after the crimping occurs, the connector must be cut off because crimping is generally an irreversible operation. Thus, the connector and a length of fiber optic cable are wasted, and a new connector must then be terminated. This waste can be expensive and time-consuming, and can be an annoyance to the installer by delaying network activation. A reusable stub connector would thus be desirable.

SUMMARY OF THE INVENTION

Described and claimed herein is a fiber optic connector that, in its preferred embodiments, is completely reversible so that when a field fiber is unsuccessfully coupled to a stub fiber within a connector, one or more subsequent attempts may be made to achieve a successful coupling using the same connector and possibly even the same stripped end of fiber. This saves time for the installer and avoids wasted fiber optic connectors and other materials.

Among the most advantageous features of the inventive connectors and the methods by which they are used is the full reversibility of the connection. While reversibly rotatable levers have previously been used to effectuate and release an alignment in a fiber optic connector (such as in EP1136860 A2), such connectors have not provided simultaneous buffer clamping and disengagement. Thus, such connectors have generally required an extra and irreversible (i.e., destructive) crimping of the buffer to provide beneficial strain relief to the interface of the aligned field and stub fibers. Often such a crimping step may degrade the fiber interface, but since the crimp is irreversible, nothing can be done to significantly improve the degraded connection short of cutting away the wasted connector, re-stripping and re-cleaving the fiber, and re-terminating the field fiber with a new stub fiber in a new connector. The need for this irreversible and destructive buffer crimp may be removed by connectors in accordance with the invention, as is the need for crimping more generally, while the beneficial strain relief is still provided.

In one embodiment of the invention, there is provided a fiber optic stub fiber connector for reversibly and nondestructively terminating an inserted field fiber having a buffer over a portion thereof. The connector includes a housing and a ferrule including a stub fiber disposed within and extending from a bore extending through the ferrule. The ferrule is at least partially disposed within and supported by the housing. The connector further includes a reversible actuator for reversibly and nondestructively terminating the inserted field fiber to the stub fiber. The reversible actuator includes a buffer clamp for engaging with the buffer to simultaneously provide reversible and nondestructive strain relief to the terminated field fiber.

BRIEF DESCRIPTION OF THE FIGURES

FIG. 4 is an exploded view of the SC assembly shown in FIG. 3;

FIG. 4A is an enlarged perspective view of the buffer clamp of FIG. 4;

FIG. 5 is an exploded enlarged perspective view of a portion of the SC assembly of FIG. 4;

FIG. 6 is a front elevational view of the cam of FIG. 5;

FIG. 7 is an unexploded front lower right perspective view of the portion of the SC assembly shown in FIG. 5 other than the cam;

FIG. 8 is a top plan view of the SC assembly of FIG. 4 in an assembled condition;

FIG. 9 is a right side elevational view of the SC assembly of FIG. 8;

FIG. 11 is a cross-sectional view of the SC assembly of FIG. 8 taken along the line 11-11 in FIG. 8;

FIG. 12 is a cross-sectional view of the SC assembly of FIG. 9 taken along the line 12-12 in FIG. 9;

FIG. 33 is an exploded rear upper right perspective view of an FJ assembly portion of the connector of FIG. 21;

FIG. 34 is a view of the assembly of FIG. 33 wherein one assembly has been placed into an FJ cap;

FIG. 35 is a front upper left perspective view of the assembly of FIG. 34;

DETAILED DESCRIPTION OF PREFERRED EMBODIMENTS

The invention relates generally to fiber optic connectors and more particularly to pre-polished fiber stub connectors.

Figure 1:
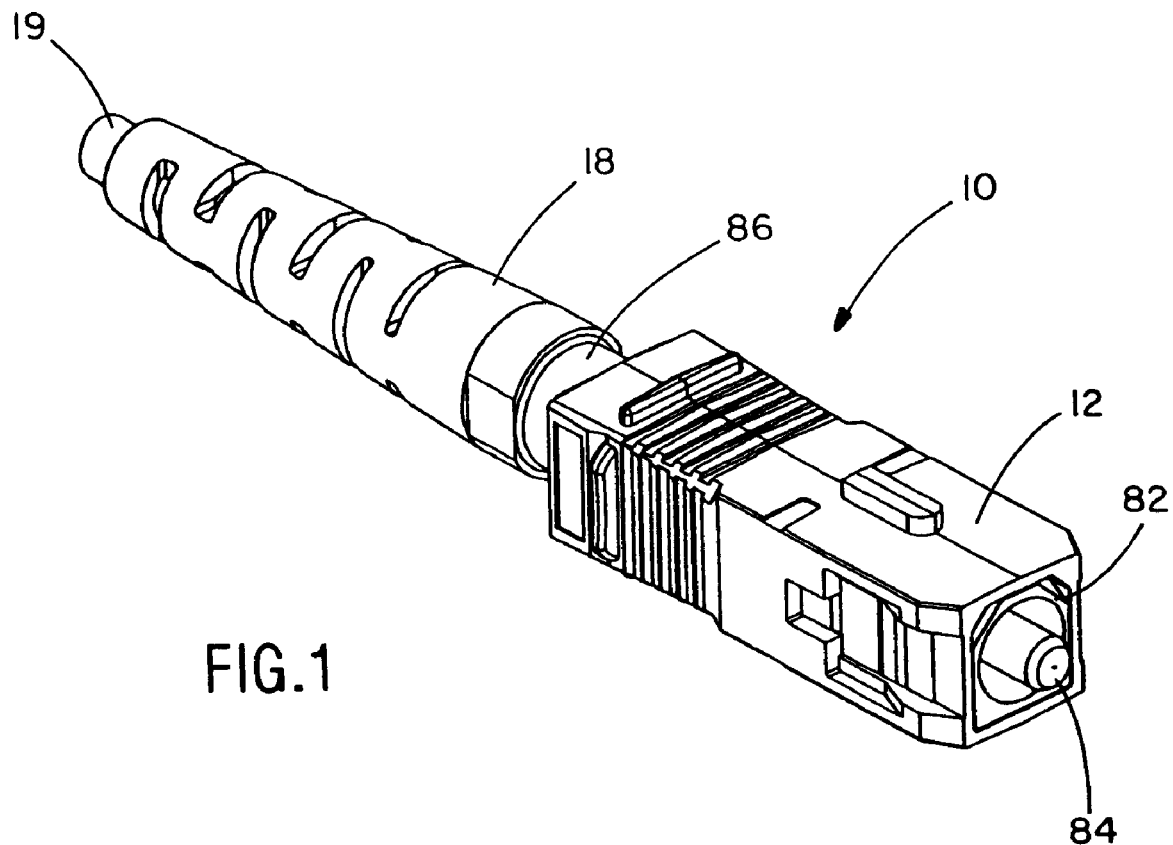
FIG. 1 is a front upper left perspective view of a connector in accordance with a preferred SC embodiment of the invention.
Figure 2:
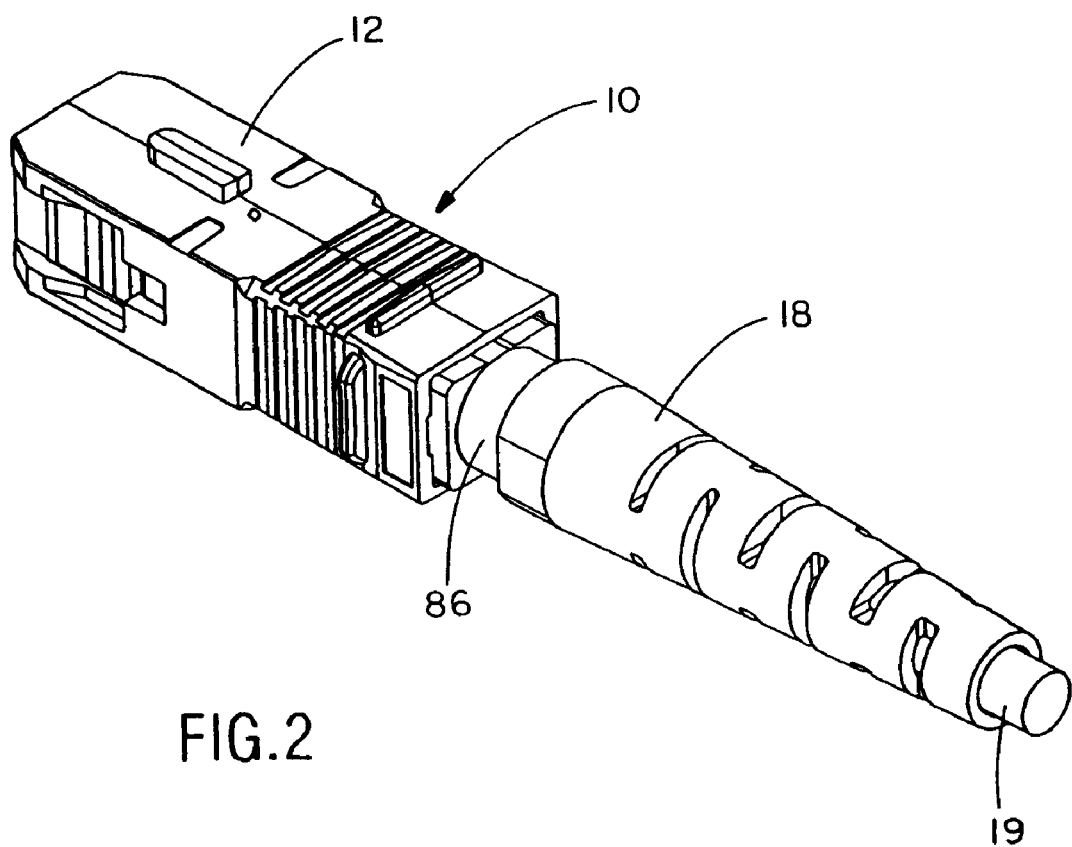
FIG. 2 is a rear upper right perspective view of the connector of FIG. 1.
Figure 3:
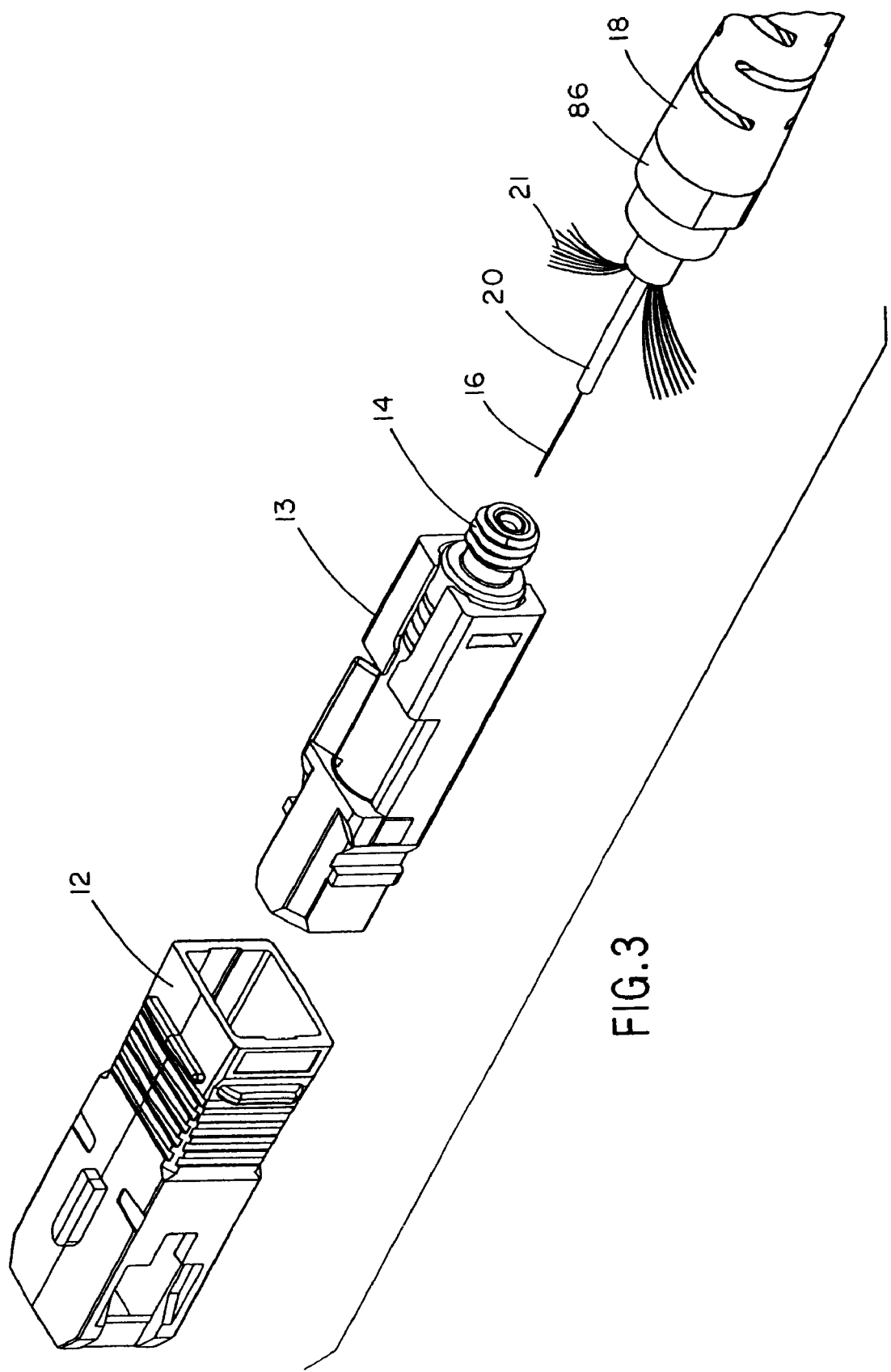
FIG. 3 is an exploded view of the connector of FIG. 2.
Figure 10:
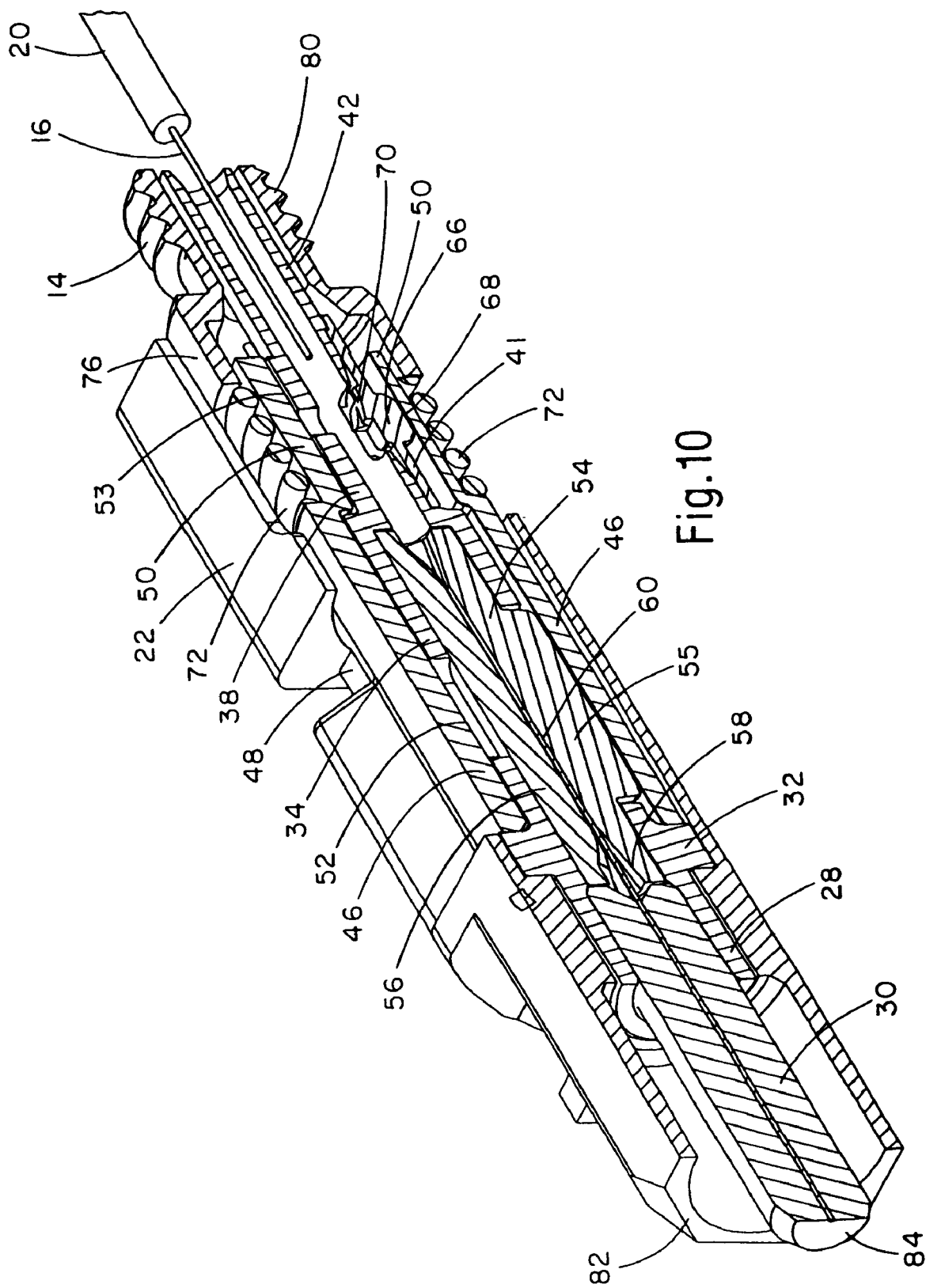
FIG. 10 is a sectional perspective view of the SC assembly of FIG. 8.
Figure 13:
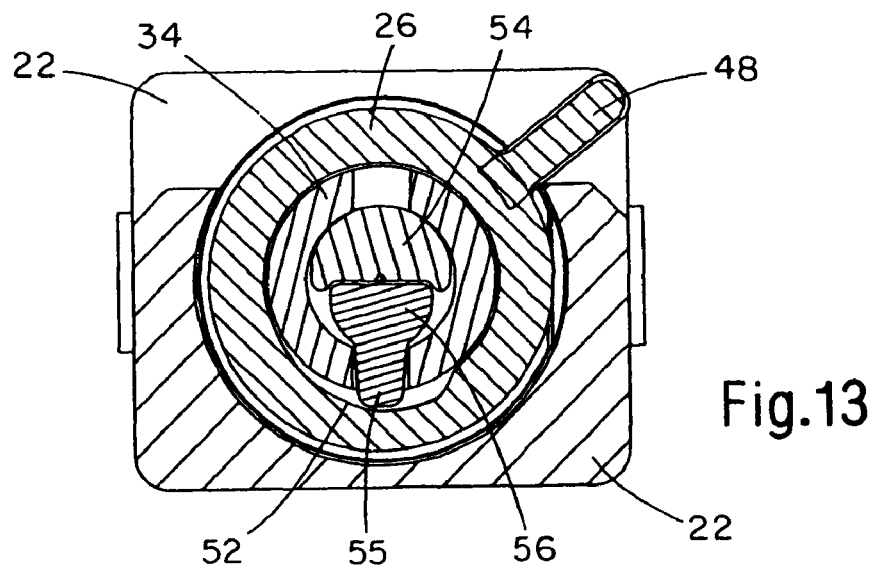
FIG. 13 is a cross-sectional view of the SC assembly of FIG. 9 taken along the line 13-13 in FIG. 9.
Figure 14:
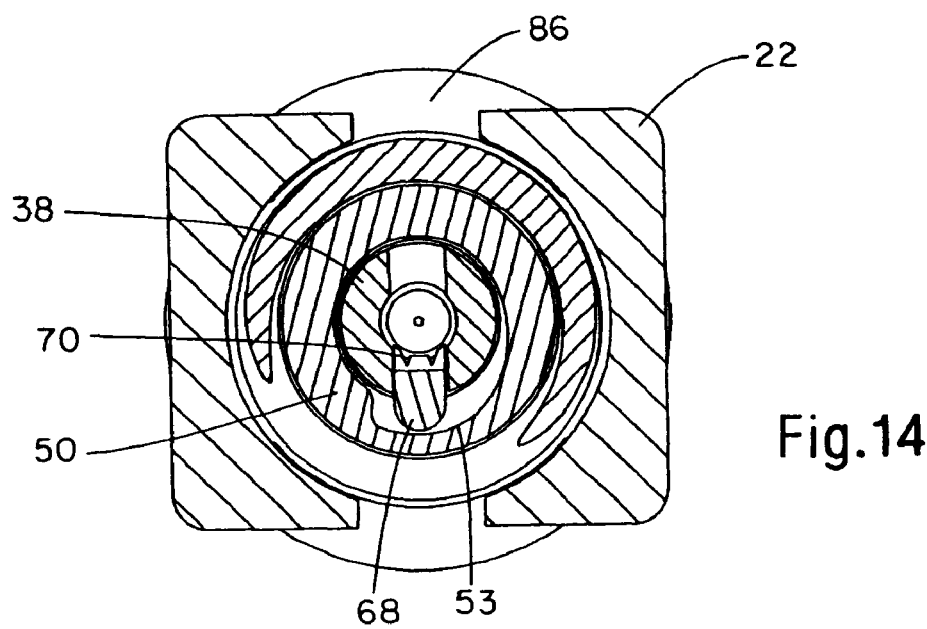
FIG. 14 is a cross-sectional view of the SC assembly of FIG. 9 taken along the line 14-14 in FIG. 9.
Figure 15:
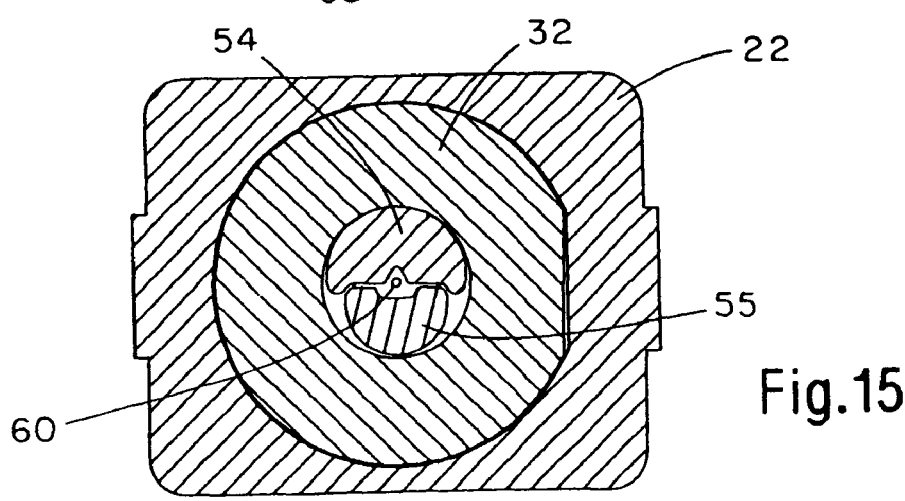
FIG. 15 is a cross-sectional view of the SC assembly of FIG. 9 taken along the line 15-15 in FIG. 9.

As seen in perspective in FIGS. 1 and 2 and exploded FIG. 3, a preferred embodiment of a reversible and nondestructive fiber optic stub connector 10 is used to terminate a field fiber. The connector 10 includes an outer housing 12 generally enclosing an SC assembly 13 with a backbone 14. The field fiber 16 is inserted into the connector through the backbone, and a boot/nut assembly having a boot 18 and retention nut 86 overwraps and supports a cable jacket 19 and a buffer 20 surrounding the fiber 16. There may also preferably be Kevlar fibers 21 disposed between the cable jacket and buffer, though in some embodiments the field fiber may only be buffered, with no cable jacket or Kevlar fibers.

As seen in FIGS. 4 and 5, the SC assembly has an inner housing 22 containing a hollow ferrule holder 24 and a cam 26. The ferrule holder has a ferrule-receiving portion 28 for surrounding one end of a ferrule 30, a flange portion 32, a large barrel portion 34 having a rib slot 36, a medium barrel portion 38 having a clamp slot 40 for receiving a buffer clamp 41, and a small barrel portion 42 having an opening 44 at its end. The cam 26 includes a large barrel portion 46 having a lever 48 extending outwardly therefrom, and a small barrel portion 50. There is a large interior cam surface 52 within the large barrel portion 46 of the cam 26 and a small interior cam surface 53 within the small barrel portion 50 of the cam 26, the cam surfaces having variable radii from the center of the cam (the axis of the coaxial barrel portions of the cam). Although as seen in FIG. 6, the larger and smaller radii of the respective cam surfaces 52 and 53 are generally in angular alignment, it is not required that they be so aligned, and depending on the locations and orientations of other connector components, there may be no such alignment.

As can be further seen in these exploded figures, the shown embodiment of the connector includes a pair of planks, a clamp plank 54 and a v-groove plank 56. The planks 54 and 56, which are inserted through the ferrule receiving portion 28 and flange portion 32 of the ferrule holder 24 and into the large barrel portion 34 thereof, cooperatively define a groove therebetween. In the shown embodiment, the groove 57 is generally present in the v-groove plank 56 and comes flush with a surface of the clamp plank 54 when the planks abut. Both ends of the planks preferably have tapered lead-in portions 58 to facilitate fibers being inserted into the groove when the planks abut one another. The clamp plank 54 includes a rib 55 extending outwardly therefrom for projecting through the rib slot 36 of the large barrel portion 34.

Once the planks are inserted into the large barrel portion of the ferrule holder, the ferrule 30 and its associated stub fiber 60 are inserted into the ferrule-receiving portion 28 of the ferrule holder 24. The stub fiber 60 extends from the ferrule 30 into the front lead-in portions 58 and the groove 57 between the planks 54 and 56. The planks are generally flush against the ferrule 30, and while the front ends of the planks are generally near the interface between the ferrule-receiving portion 28 and flange portion 32 of the ferrule holder 24, the majority of the planks are disposed within the large barrel portion 34 thereof. The tapered lead-in portion 58 on the stub side of the planks prevents the preferably precision cleaved end of the stub fiber from being damaged if the fiber is not perfectly aligned with the groove upon entry.

The buffer clamp 41, seen in detail in FIG. 4A, is preferably integral and includes a ring portion 62 and a stem portion 64. Partway along the length of the stem, there is preferably disposed a transverse portion 66 having a cam-following surface 68 at one end and a grasping portion 70 at its opposite end. In a preferred embodiment of the invention, the grasping portion is inclined to provide a lead-in for the fiber so that the buffer does not get caught thereon upon insertion. Also in a preferred embodiment, the grasping end includes teeth 71 that grip the buffer through the clamp slot 40. The buffer clamp 41 is applied to the ferrule holder 24 by circumscribing (i.e., clipping) the ring portion 62 around the end of the small barrel portion 42 next to where it steps up to the medium barrel portion 38 such that the stem portion 64 fits into the clamp slot 40 in the medium barrel portion 38.

The cam 26 is slid over the three barrel portions 34, 38, and 42 of the ferrule holder 24 until it comes flush with the flange portion 32 thereof. Given that the rib 55 of the upper crimp plank 54 protrudes through the rib slot 36 of the large barrel portion 34 and that the transverse portion 66 and its cam following surface 68 of the buffer clamp 41 protrude from the clamp slot 40 of the medium barrel portion 38, the cam 26 will have to be appropriately angularly oriented when it is being slid over the ferrule holder 24 so that the larger radii of the respective interior cam surfaces, 52 and 53, will fit over these protruding elements and not interfere with them such that the cam sleeve cannot be applied over the ferrule holder.

The spring 72 fits over the outside of the small barrel portion 50 of the cam 26 and provides compressive resistance behind the ferrule so that when the connector is mated to an appropriate port or other connector, good contact pressure between the respective ferrules or the ferrule 30 and a contact point on the port may be achieved. The tabs 78 on the barrel portion 76 are tapered to permit the backbone to be pressed into the aperture, such that the tapered tabs flex the split housing apart during insertion and permit the housing to resiliently snap back after the tabs have cleared. The tabs preferably retain the backbone within the inner housing. The externally threaded portion 80, protrudes from the aperture 74.

The SC assembly 13 is preferably produced in the factory so that the field operator who uses the connector to make a fiber optic connection has it preassembled. This limits the amount of assembly needed to be performed in the field. To terminate a field fiber 16 with the pre-assembled connector, the cable jacket 19 is preferably stripped off a predetermined length of the buffer 20, as shown in FIG. 4. A retention nut 86, preferably pre-assembled with the boot 18, is slid over the end of the field fiber 16 such that the fiber protrudes through the nut. The barrel portion 90 of the retention nut 86 is internally threaded so that it may be screwed onto the externally threaded portion 80 of the backbone 14 after the field fiber is terminated. The end of the fiber is then preferably precision cleaved so that it will more cleanly engage the stub fiber 60.

The field fiber is inserted through the externally threaded 80 portion of the backbone 14, through the small barrel portion 42 and medium barrel portion 38 and into the lead-in portions 58 and groove 57 of the planks 54 and 56 within the large barrel portion 34 of the ferrule holder 24. The field fiber is inserted until its end contacts the end of the stub fiber 60 approximately half way over the length of the planks and approximately half way along the length of the rib 55 on the clamp plank 54. Index-matching gel may preferably be supplied in the back half of the groove to refractively limit signal loss at the interface of the field fiber and stub fiber once the field fiber is appropriately aligned.

Figure 16:
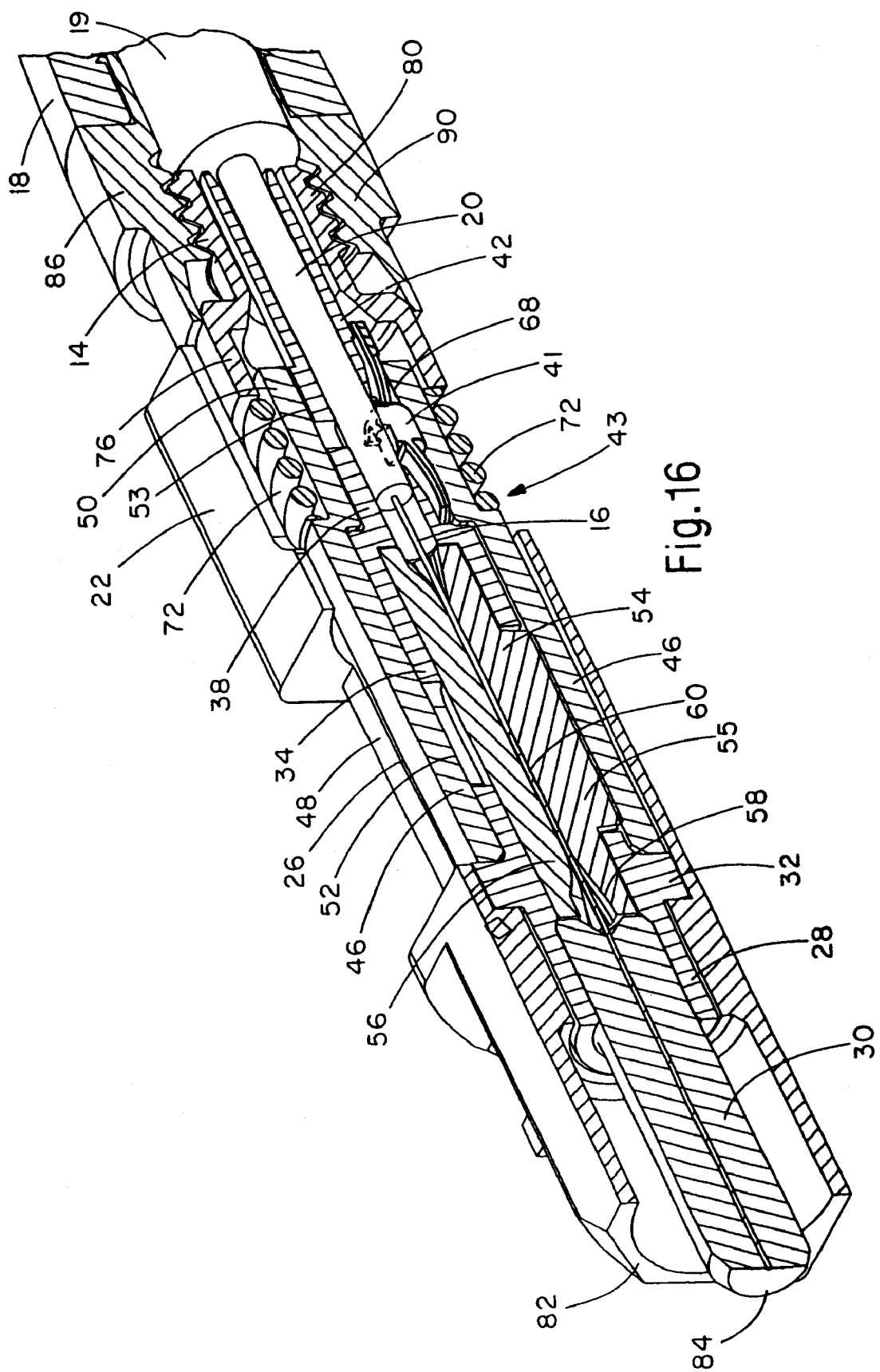
FIG. 16 is a front upper right perspective cross-sectional view of the SC assembly of FIG. 9 with the nut and boot attached.
Figure 17:
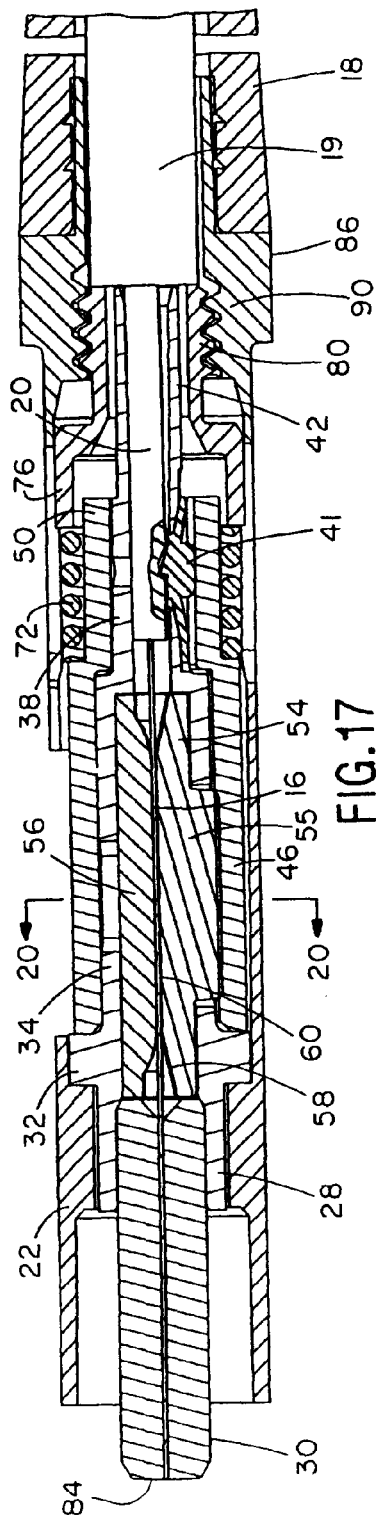
FIG. 17 is a right side elevational cross-sectional view of the assembly of FIG. 16.
Figure 18:
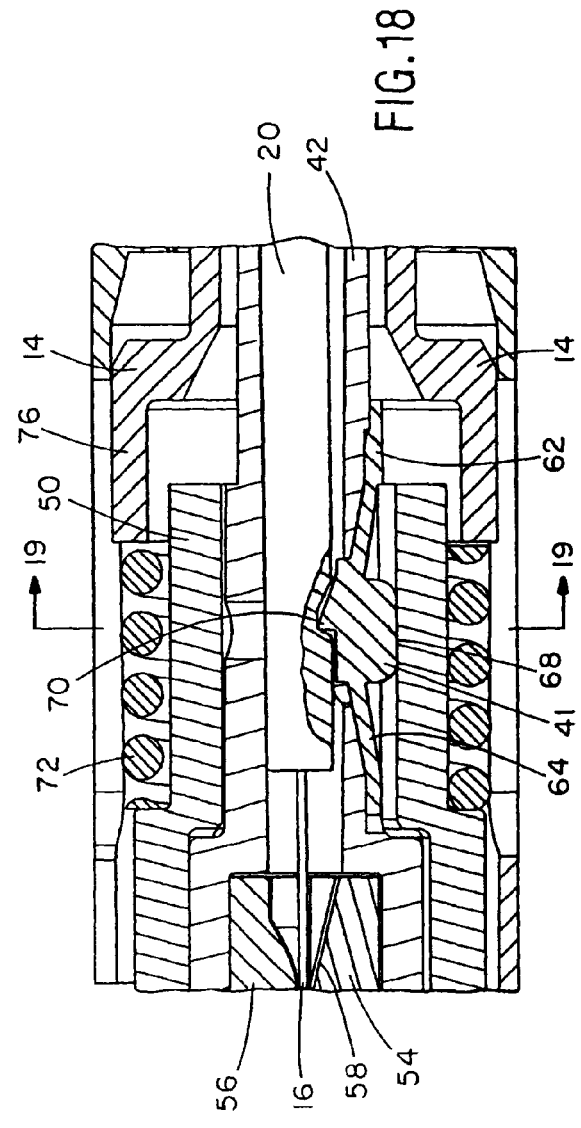
FIG. 18 is a close-up broken-away view of a portion of the assembly of FIG. 17.
Figure 19:
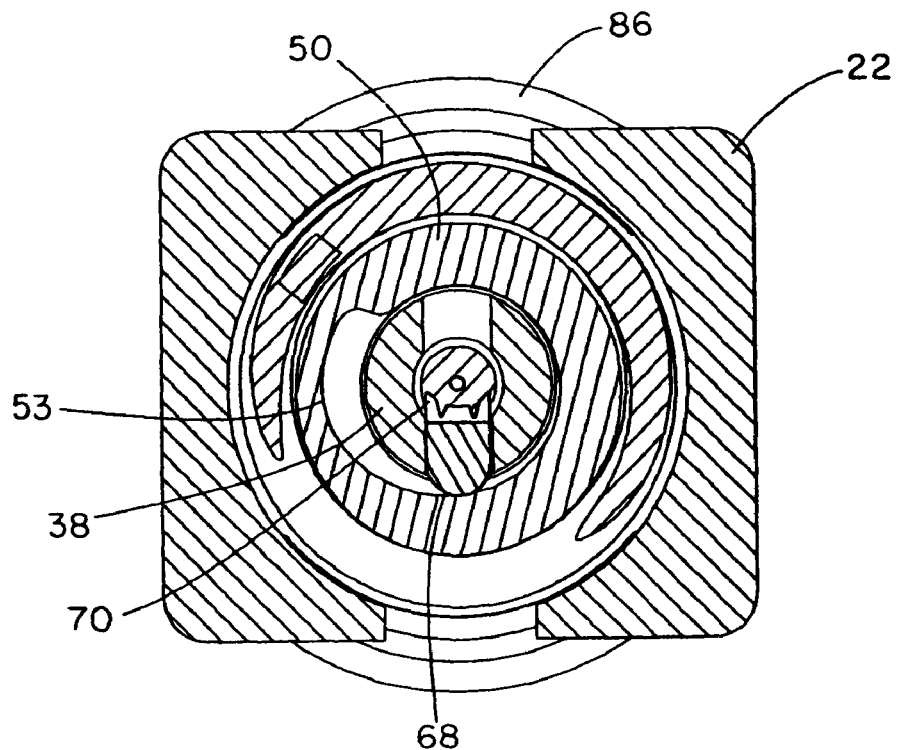
FIG. 19 is a cross-sectional view of the assembly of FIG. 17 taken across the line 19-19 in FIG. 18.
Figure 20:
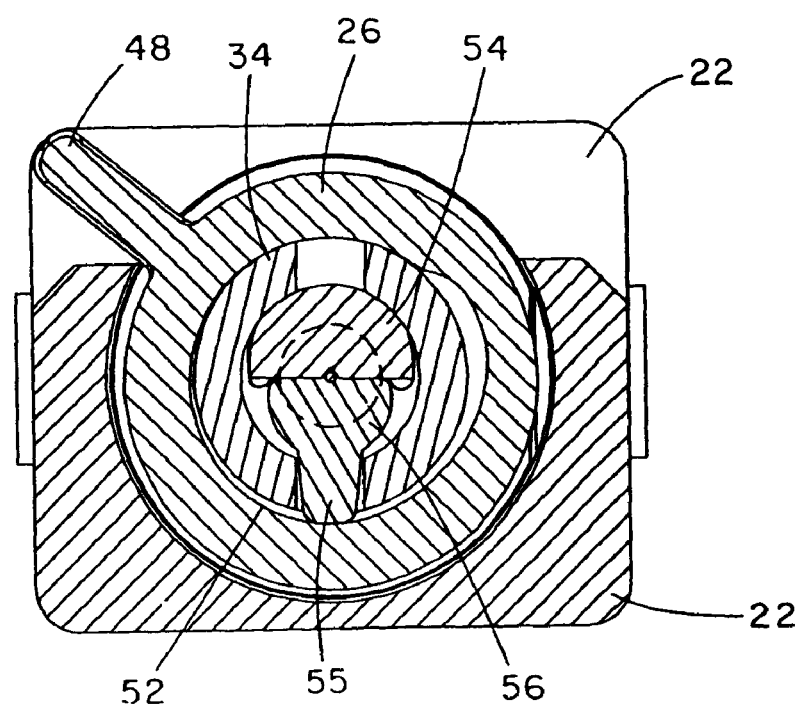
FIG. 20 is a cross-sectional view of the assembly of FIG. 17 taken across the line 20-20 in FIG. 17.
Figure 21:
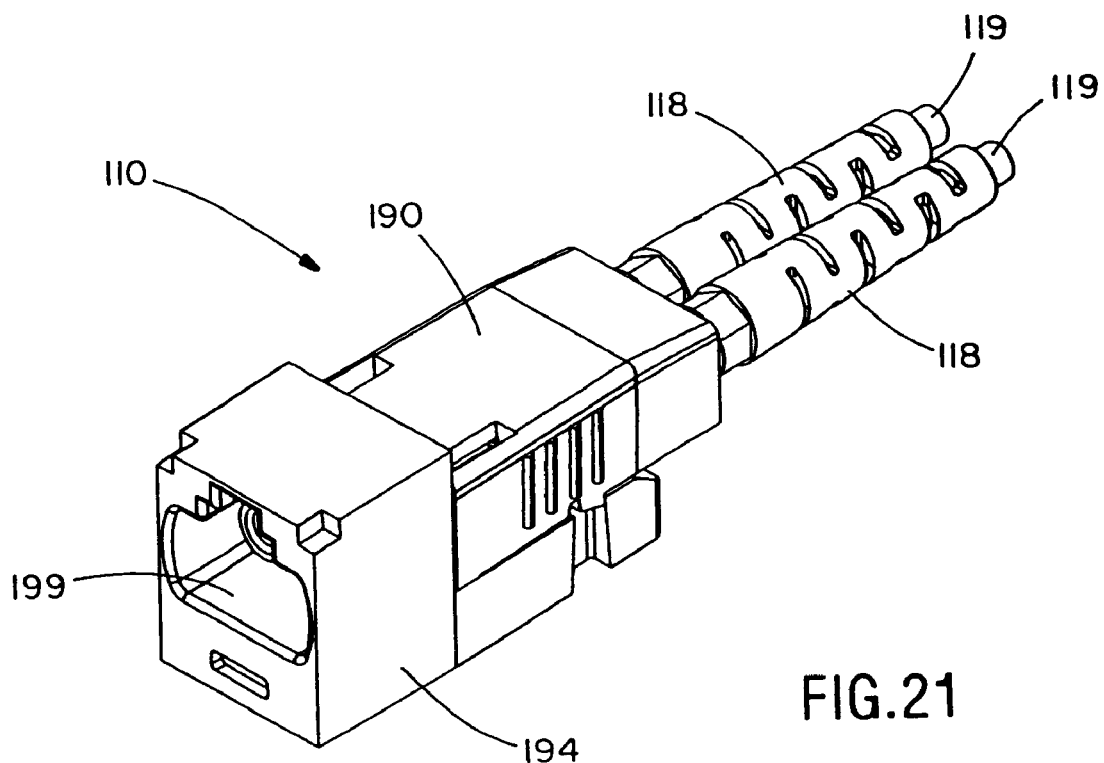
FIG. 21 is a front upper right perspective view of a connector in accordance with a preferred FJ jack embodiment of the invention.
Figure 22:
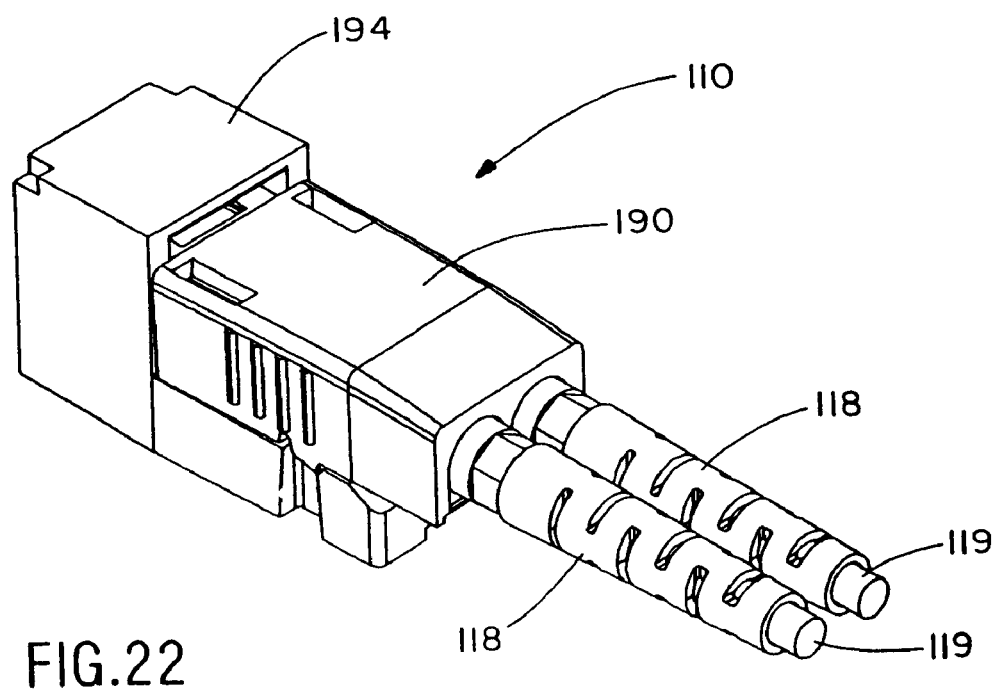
FIG. 22 is a rear upper right perspective view of the connector of FIG. 21.
Figure 23:
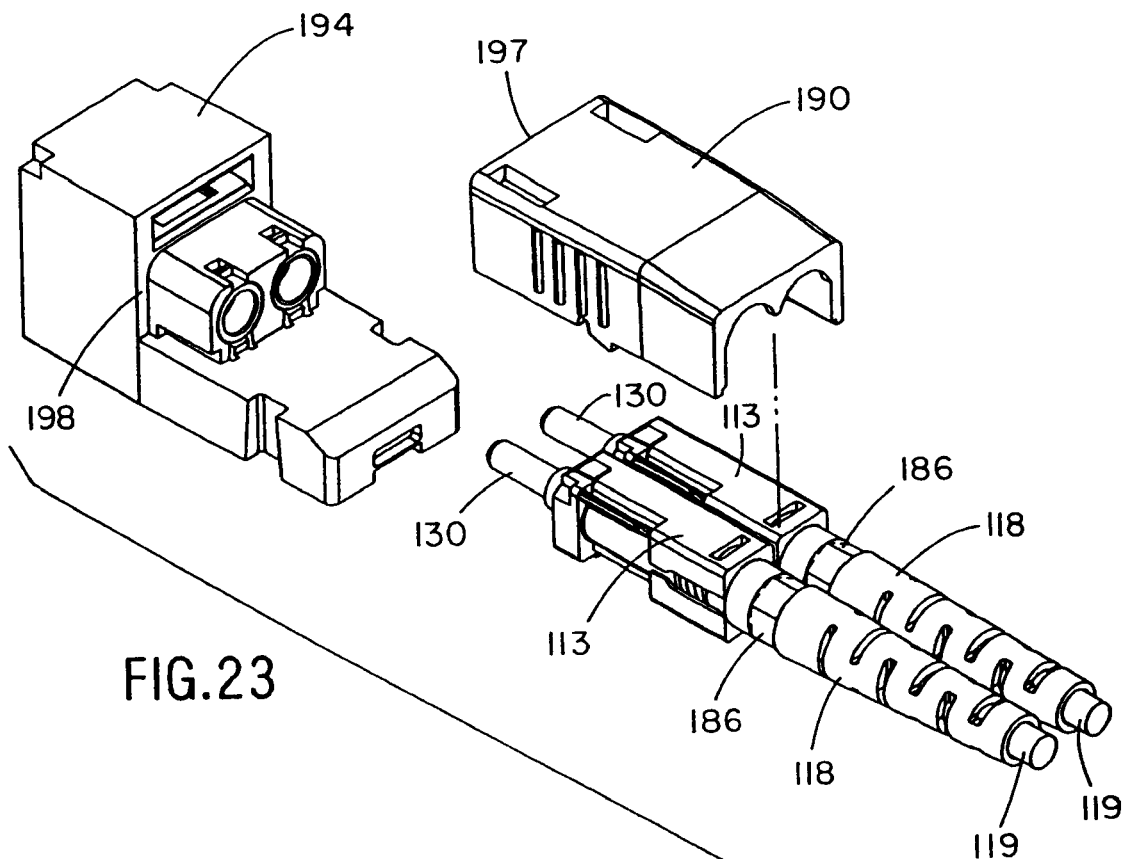
FIG. 23 is an exploded view of the connector of FIG. 22.
Figure 24:
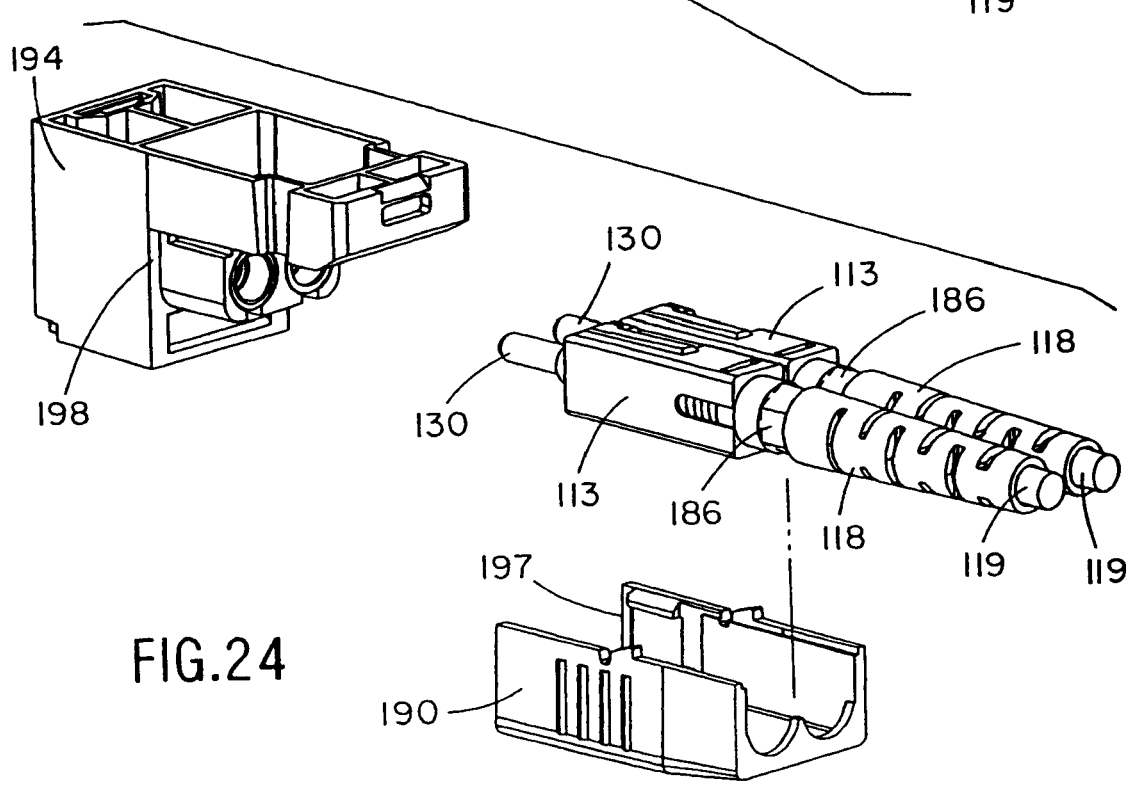
FIG. 24 is an inverted view of the connector of FIG. 23.

Once the operator determines that the fiber ends have made contact, he manually rotates the lever 48 of the cam 26 that protrudes from an open portion of the inner housing 22. Rotation of the cam causes the large interior first cam surface 52 to tighten over the rib 55 that is protruding through rib slot 36 in the large barrel portion 34 from clamp plank 54. This causes the planks 54 and 56 to be squeezed together along their abutting surfaces and the groove 57 therealong, thereby compressing the stub fiber end and field fiber end to hold them in place along the length of the groove 57 and better align them to each other within the groove at their interface. At the same time, the small interior second cam surface 53 tightens over the cam-following surface 68 of the buffer clamp 41, thereby causing the grasping portion 70 thereof to compress against the buffer 20, providing strain relief for the field fiber and inhibiting any pulling of the stub and field fiber ends away from one another within the groove. Additionally, the teeth 71 of the buffer clamp inhibit rotational movement of the buffer layer and the fiber inside. The cam 26 and the buffer clamp 41 comprise a reversible actuator 43, as shown in FIG. 16.

Testing may be performed during the connection method by way of a local testing device, such as a visible fault locator (VFL). Because no irreversible and/or destructive crimping, connecting or strain relief measures are performed, if the testing indicates the fiber optic connection, or even the mechanical connection, to be inadequate, the entire connective method is fully nondestructively reversible by manually rotating the lever 48 of the cam 26 back into its original position. This simultaneously releases pressure on the rib 55 (and thereby the planks 54 and 56) and releases the compression of the buffer clamp 41 on the buffer. Thus, the field fiber may simply be rotated or otherwise agitated prior to reclamping the connector and once again determining whether a successful connection has been completed. Alternatively, the field fiber may be withdrawn from the connector at that point, optionally recleaved, and subsequently reinserted for another attempt at a successful connection. As with regard to other uses of the term "simultaneous" herein, actual chronological coincidence is not required within the context of the invention, the term more generally referring to actions occurring around the same time and/or caused by the same triggering event.

The front end 82 of the inner housing 22 is then inserted into the mouth of the outer housing 12, until the inner housing is completely swallowed by the outer housing and complementary structure on the outside of the inner housing and inside of the outer housing engages such that the inner housing is retained within the outer housing. The lever 48 of the cam 26 may preferably need to be rotated to a particular angular orientation to facilitate insertion of the ferrule holder 24 and cam 26 into the inner housing 22 (to form the SC assembly 13), and then subsequently to further facilitate the insertion of the SC assembly 13 into the outer housing 12. The inner housing 22 preferably limits rotation of the lever 48 where the cam is fully actuated. Once the SC assembly 13 is inserted into the outer housing 12, then, the lever 48 will preferably be angularly fixed between the ferrule holder and outer housing.

In summary then, the operator needs only to appropriately strip the field fiber, insert it into the assembly, rotate the lever 48 of the cam 26 to effect connection and strain relief at the buffer, verify the connection with a local testing device, and then insert the assembly into the outer housing 12 and screw the retention nut 86 over the externally threaded portion 80 of the backbone 14.

After successfully terminating the field fiber 16 with the pre-assembled stub-fiber connector, the connector can be inserted into an appropriately configured port in a patch panel or other device so that the preferably polished front face 84 of the ferrule 30 and similarly polished front end of the stub fiber 60 may interface the device and permit signals to pass from the field fiber to the device or vice-versa.

Among the most advantageous features of the inventive connectors and the methods by which they are used is the full reversibility of the connection. While reversibly rotatable levers have previously been used to effectuate and release an alignment in a fiber optic connector (such as in EP1136860 A2), such connectors have not provided simultaneous buffer clamping and disengagement. Thus, such connectors have generally required an extra and irreversible (i.e., destructive) crimping of the buffer to provide strain relief to the interface of the aligned field and stub fibers. Often such a crimping step may degrade the fiber interface, but since the crimp is destructive, nothing can be done to significantly improve the degraded connection short of cutting away the wasted connector, re-stripping and re-cleaving the fiber, and re-terminating the field fiber with a new stub fiber in a new connector. The need for this irreversible and destructive buffer crimp may be removed by connectors in accordance with the invention, as is the need for crimping more generally.

It is contemplated within the scope of the invention that the reversible actuator that may simultaneously align/terminate the fibers while providing strain relief on the buffer may essentially be two independent actuators, one for aligning/terminating the fibers and one for providing reversible and nondestructive strain relief on the buffer. While such an arrangement might involve an extra step in engaging the connector, depending upon whether the two actuations could both be toggled in a single step, functionality or cost benefits could accrue from having the functions performed independently while preserving the nondestructiveness and full reversibility of the strain relief provided on the buffer. While the reversible actuator shown in the figures is a cam, any type of reversible actuator, e.g., a switch, is considered to be usable within the context of the invention.

The invention may be embodied in connectors differently formatted than the above disclosed SC-style optical plug, and FIGS. 21-37 show an alternative embodiment of the invention, a connector generally configured to be an FJ-style optical jack. It is possible to employ the invention within other formats, however, such as plugs or jacks conformed to the SC, LC, ST, or FJ standards.

Figure 25:
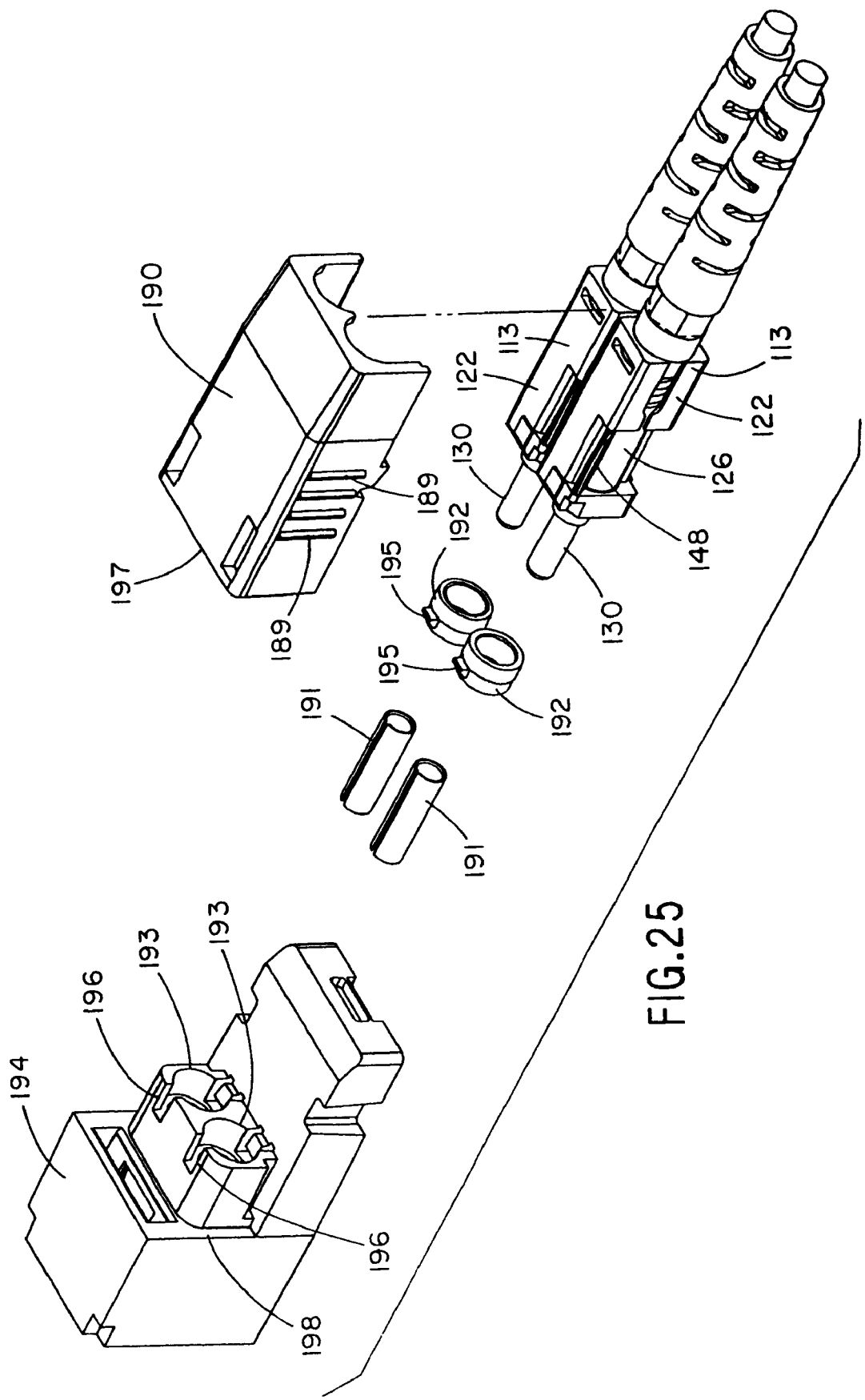
FIG. 25 is a further exploded view of the connector of FIG. 23.
Figure 26:
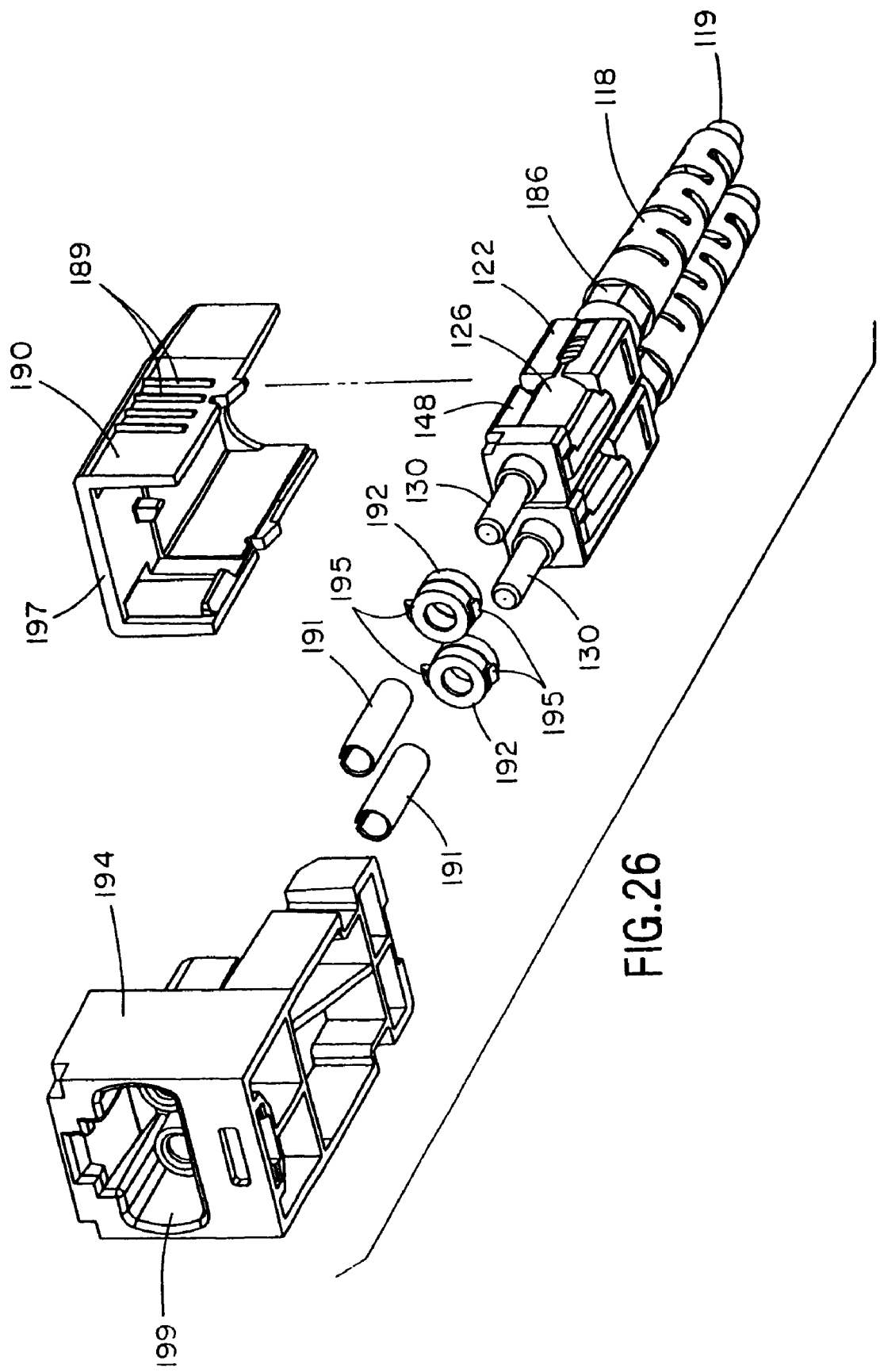
FIG. 26 is an exploded front lower right perspective view of the connector of FIG. 21.
Figure 27:
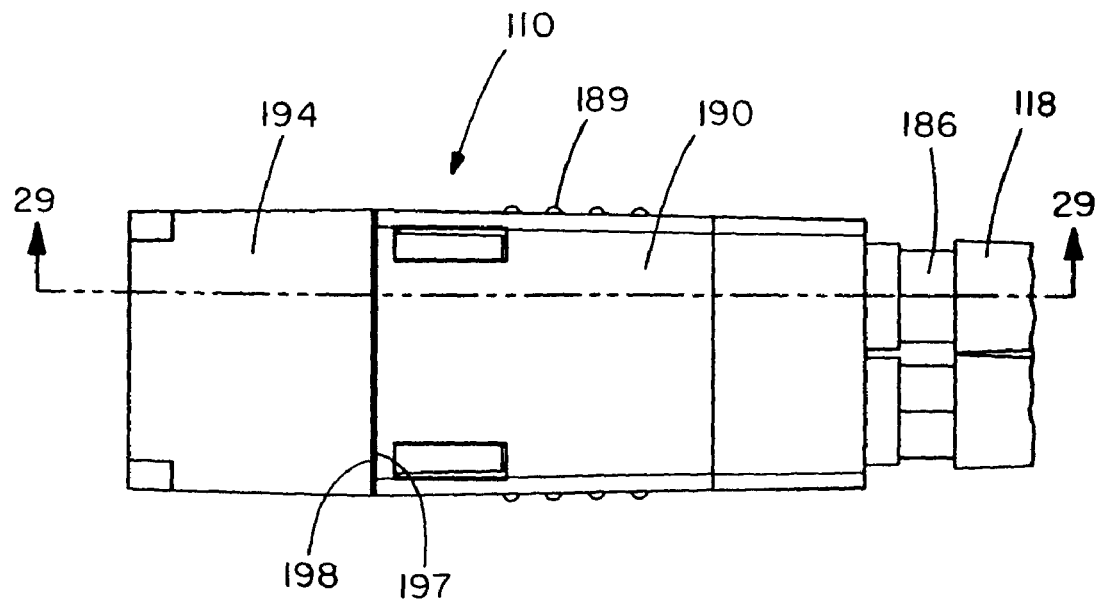
FIG. 27 is a top plan view of the connector of FIG. 21.
Figure 28:
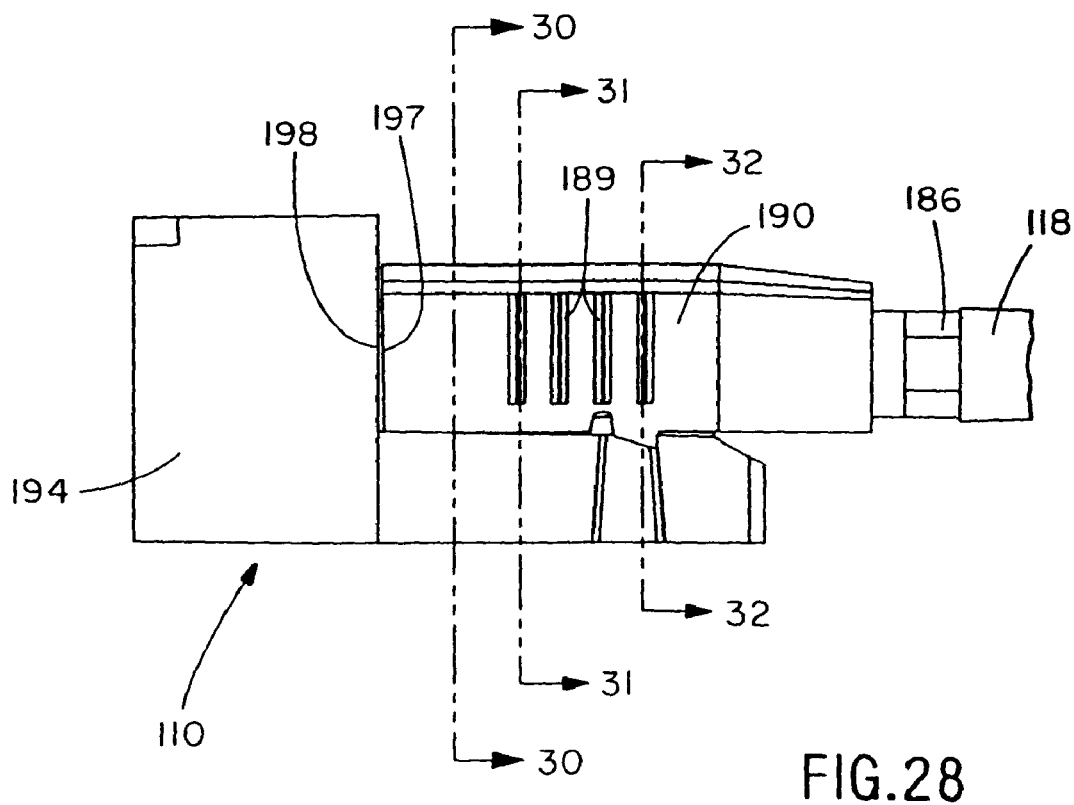
FIG. 28 is a right side elevational view of the connector of FIG. 27.
Figure 29:
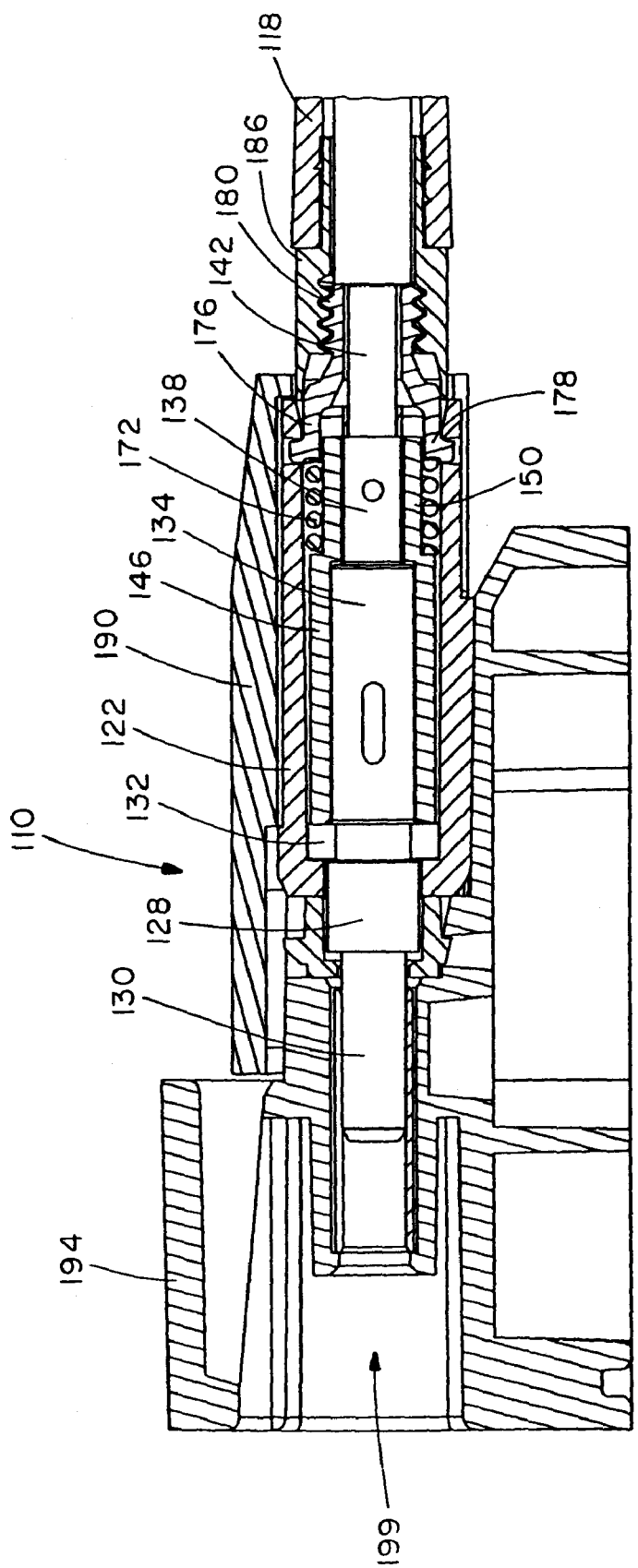
FIG. 29 is a cross-sectional view of the connector of FIG. 27 taken along the line 29-29 in FIG. 27.
Figure 30:
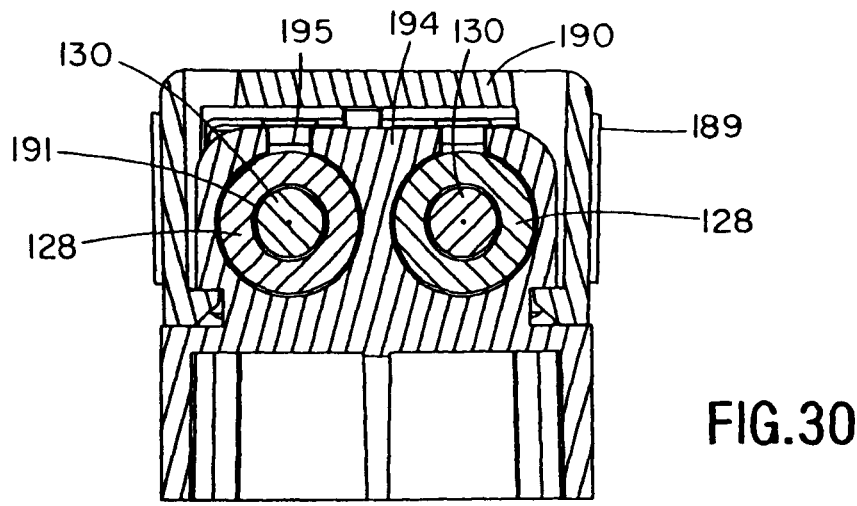
FIG. 30 is a cross-sectional view of the connector of FIG. 28 taken along the line 30-30 in FIG. 28.
Figure 31:
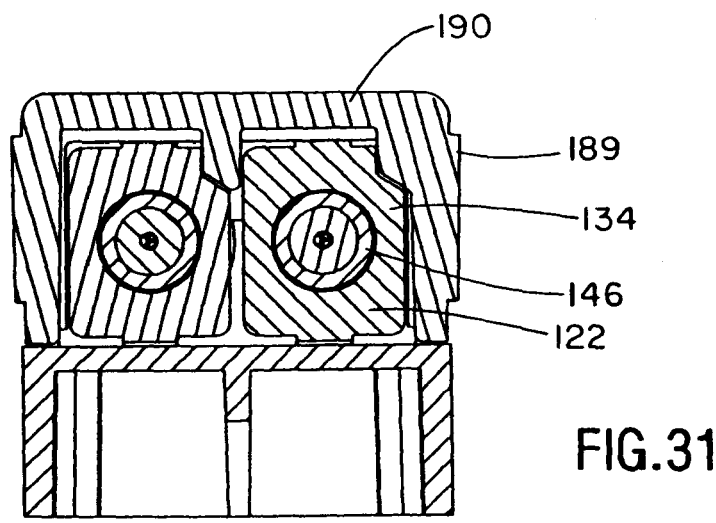
FIG. 31 is a cross-sectional view of the connector of FIG. 28 taken along the line 31-31 in FIG. 28.
Figure 32:
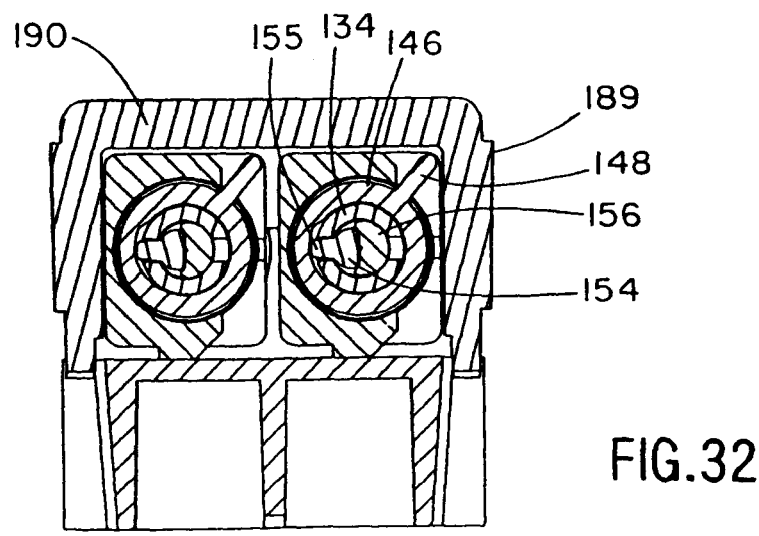
FIG. 32 is a cross-sectional view of the connector of FIG. 28 taken along the line 32-32 in FIG. 28.
Figure 36:
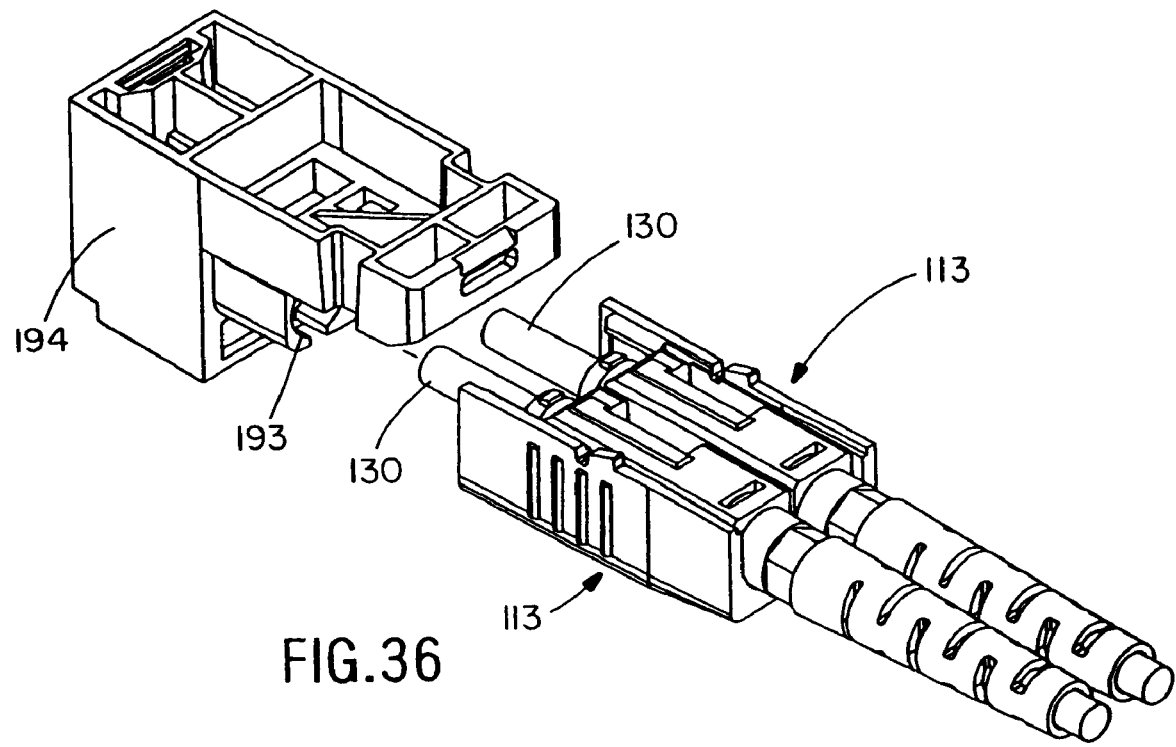
FIG. 36 is a view akin to that of FIG. 24 wherein the assemblies have been placed within the FJ cap and are aligned with an FJ housing.
Figure 37:
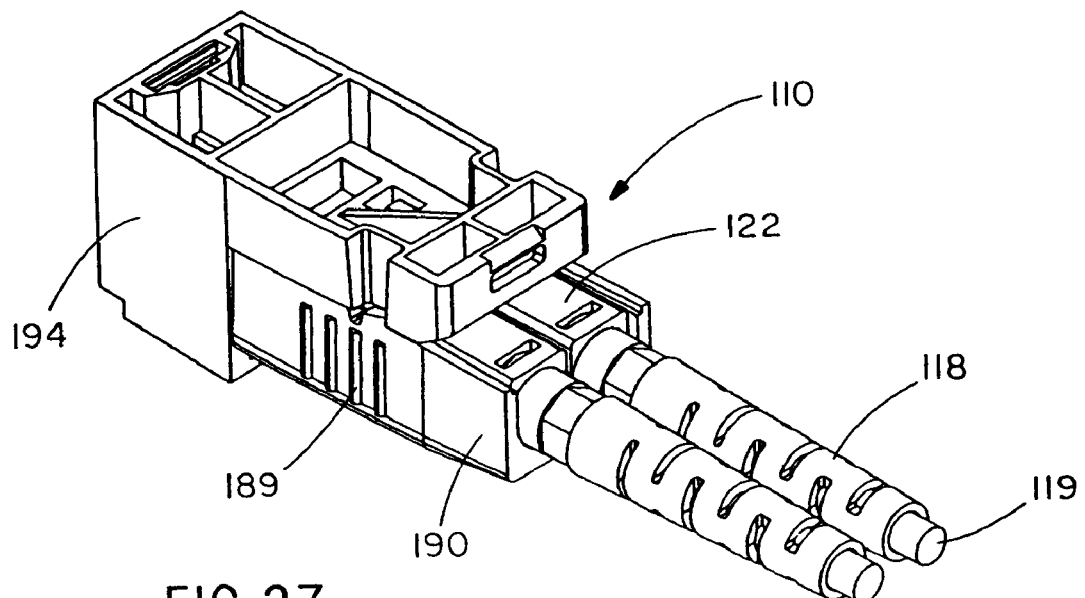
FIG. 37 is a view akin to FIG. 36 wherein the connector is fully assembled.

The FJ jack 110 of FIGS. 21-37, as seen in FIGS. 25 and 26 particularly, essentially employs two SC assemblies identical to the one described above for the SC-style plug connector with additional components to match the FJ standard. With equivalent pieces of the FJ embodiment numbered 100 more than their corresponding parts in the SC connector, the two assemblies 113 are placed side-by-side into an FJ cap 190. The two ferrules 130 are circumscribed by split sleeves 191 that are held in place by split sleeve retainers 192. The ferrules and attached split sleeves are fitted into ferrule openings 193 in an FJ housing 194. The retainers 192 may preferably include tabs 195 for fitting into grooves 196 in the ferrule openings 193. A front edge 197 of the cap 190, which fits over the assemblies 113, will generally preferably come flush with a rear portion 198 of the FJ housing 194 when the split sleeve-encircled ferrules 130 are fully inserted into the openings 193. The FJ housing 194 includes a recessed front portion 199 providing access to the preferably polished front faces 184 of the ferrules 130 for receiving and mating with a correspondingly configured FJ-plug type connector or other compatible connector. The front ends 182 of the inner housings 122 may include less latching structure than in the SC embodiment(s) since the FJ cap 190 and housing 194 replace the need for latching to an outer housing, such as outer housing 12. Other latching on the cap and housing may be used to facilitate retention. Ribs 189 may preferably be placed on the cap to facilitate manually gripping the cap and connector.

The FJ jack embodiment of the invention retains the full reversibility advantages described relative to the SC plug embodiment, as each of the two fiber optic connections is fully reversible by rotating lever 148. Additionally, given their side-by-side placement within the FJ cap and housing, the rotation and angular placement of the levers 148 on the cams may be advantageously located such that only when the levers are rotated to a closed position (i.e., aligned fibers) may the assemblies be inserted into the cap and housing. Another advantage of the FJ-jack 110 is that the ferrules 130 may float on the springs 172 to provide contact pressure when the jack engages a plug or other connective hardware.

The illustrated and above-described embodiments of the invention are exemplary only and are not intended to limit the scope of protection in any way. To the contrary, the invention is considered to include embodiments not specifically shown or described herein. For example, a buffer clamp having a grasping portion structurally different than the one shown in FIG. 4A would nevertheless be considered to be within the scope of the invention. Similarly, a buffer clamp that engaged the buffer in a different manner to provide strain relief would also be considered to be within the scope of the invention. Also, a buffer need not include any particular type of material, and circumscribing materials of different types may be alternatively present in accordance with various embodiments of the invention. Additionally, the invention is not limited to the particular SC and FJ optical formats described and illustrated herein, as the invention could be employed in other optical formats currently or not yet existing. Similarly, the invention could be employed in a plug-like or jack/receptor-like connector, as the male/female structure generally does not prevent use of the invention. The invention is defined by the following claims.

The invention claimed is:

1. A fiber optic stub fiber connector for reversibly terminating an inserted field fiber comprising:
   a housing;
   a ferrule with a stub fiber disposed within;
   a ferrule holder retaining the ferrule;
   a reversible actuator capable of providing nondestructive and reversible strain relief on the field fiber at a location apart from a location of a termination of the stub fiber to the field fiber.

2. The connector of claim 1 wherein the reversible actuator is manually movable alternately between a first position, wherein the inserted field fiber is held in generally abutting alignment with the stub fiber, and a second position, wherein the field fiber is not generally held within the connector.

3. The connector of claim 2 wherein the reversible actuator comprises a cam.

4. The connector of claim 3 wherein the cam includes a manually rotatable lever for actuating the cam.

5. The connector of claim 4 wherein the lever is rotatively limited by the housing upon reaching at least one of the first and second positions.

6. The connector of claim 1 wherein the connector is an SC-type.

7. The connector of claim 1 wherein the connector is an FJ-type.

* * * * *